(12) United States Patent
Lee

(10) Patent No.: US 10,444,978 B2
(45) Date of Patent: Oct. 15, 2019

(54) ELECTRONIC DEVICE AND METHOD OF CONTROLLING THE SAME

(71) Applicant: LG ELECTRONICS INC., Seoul (KR)

(72) Inventor: Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 15/807,501

(22) Filed: Nov. 8, 2017

(65) Prior Publication Data

US 2018/0373408 A1    Dec. 27, 2018

(30) Foreign Application Priority Data

Jun. 27, 2017   (KR) ........................ 10-2017-0081306

(51) Int. Cl.
*G06F 3/0488* (2013.01)
*G06F 3/0486* (2013.01)
(Continued)

(52) U.S. Cl.
CPC .......... *G06F 3/0488* (2013.01); *G01S 17/026* (2013.01); *G06F 1/165* (2013.01); *G06F 1/1626* (2013.01); *G06F 1/1637* (2013.01); *G06F 1/1643* (2013.01); *G06F 1/1656* (2013.01); *G06F 1/1694* (2013.01); *G06F 3/016* (2013.01);
(Continued)

(58) Field of Classification Search
CPC ......... H04M 2250/16; H04M 2250/22; H04M 1/0266; G06F 3/0488; G06F 3/04886; G06F 1/1694; G06F 3/0414; G06F 1/165; G06F 3/0486; G01S 17/026

See application file for complete search history.

(56) References Cited

U.S. PATENT DOCUMENTS

| 2010/0156887 A1* | 6/2010 | Lindroos | ............... G06F 1/1626 345/418 |
| 2010/0214249 A1* | 8/2010 | Ikeda | ..................... G06F 3/041 345/173 |

(Continued)

FOREIGN PATENT DOCUMENTS

| EP | 2998850 | 3/2016 |
| EP | 3041201 | 7/2016 |

OTHER PUBLICATIONS

European Patent Office Application Serial No. 18166006.9, Search Report dated Nov. 6, 2018, 11 pages.

*Primary Examiner* — Abdelaaziz Tissire

(74) *Attorney, Agent, or Firm* — Lee, Hong, Degerman, Kang & Waimey

(57) ABSTRACT

An electronic device is provided. A display unit includes: a first region which forms a front surface of a body; a second region extended from the first region to one region of a rear surface, and including a curved region; and a third region formed on one region of side surfaces by being extended from the first region, and formed as a curved region, wherein a controller controls the display unit to output specific screen information to the first region, if a touch input applied to the second region is sensed, or if an object disposed near the second region is sensed, and wherein the controller controls the display unit to output specific screen information to the second region, if a touch input applied to the first region is sensed, or if an object disposed near the first region is sensed.

23 Claims, 22 Drawing Sheets

(51) Int. Cl.
*G06F 3/041* (2006.01)
*G06F 1/16* (2006.01)
*G01S 17/02* (2006.01)
*H04M 1/02* (2006.01)
*G06F 3/01* (2006.01)

(52) U.S. Cl.
CPC .......... *G06F 3/0414* (2013.01); *G06F 3/0486* (2013.01); *G06F 3/04886* (2013.01); *H04M 1/0266* (2013.01); *H04M 2250/16* (2013.01)

(56) References Cited

U.S. PATENT DOCUMENTS

| | | | | |
|---|---|---|---|---|
| 2011/0050657 A1* | 3/2011 | Yamada | ............. | H01L 27/3293 345/204 |
| 2011/0128241 A1* | 6/2011 | Kang | ............. | G06F 1/1643 345/173 |
| 2013/0002583 A1* | 1/2013 | Jin | ............. | G06F 1/1637 345/173 |
| 2013/0300697 A1* | 11/2013 | Kim | ............. | G06F 1/1626 345/173 |
| 2014/0354143 A1* | 12/2014 | Jung | ............. | H01L 51/0097 313/511 |
| 2015/0015511 A1* | 1/2015 | Kwak | ............. | G06F 3/0412 345/173 |
| 2015/0043180 A1* | 2/2015 | Lee | ............. | H04M 1/0266 361/752 |
| 2015/0138041 A1* | 5/2015 | Hirakata | ............. | G06F 3/1446 345/1.3 |
| 2015/0143238 A1* | 5/2015 | Jung | ............. | G06F 3/04817 715/708 |
| 2015/0160699 A1* | 6/2015 | Choi | ............. | G06F 1/1643 345/173 |
| 2015/0261376 A1* | 9/2015 | Kim | ............. | G06F 3/0487 345/173 |
| 2015/0378592 A1* | 12/2015 | Kim | ............. | G06F 1/1626 715/765 |
| 2016/0062391 A1* | 3/2016 | Choi | ............. | G06F 1/1601 361/679.03 |
| 2017/0034446 A1* | 2/2017 | Park | ............. | H04N 5/23293 |
| 2017/0097715 A1 | 4/2017 | Kim et al. | | |
| 2018/0224963 A1* | 8/2018 | Lee | ............. | G06F 3/0488 |
| 2018/0240260 A1* | 8/2018 | Lee | ............. | G06T 11/60 |
| 2018/0275785 A1* | 9/2018 | Nakamura | ............. | G06F 3/041 |

\* cited by examiner (a)

(b)

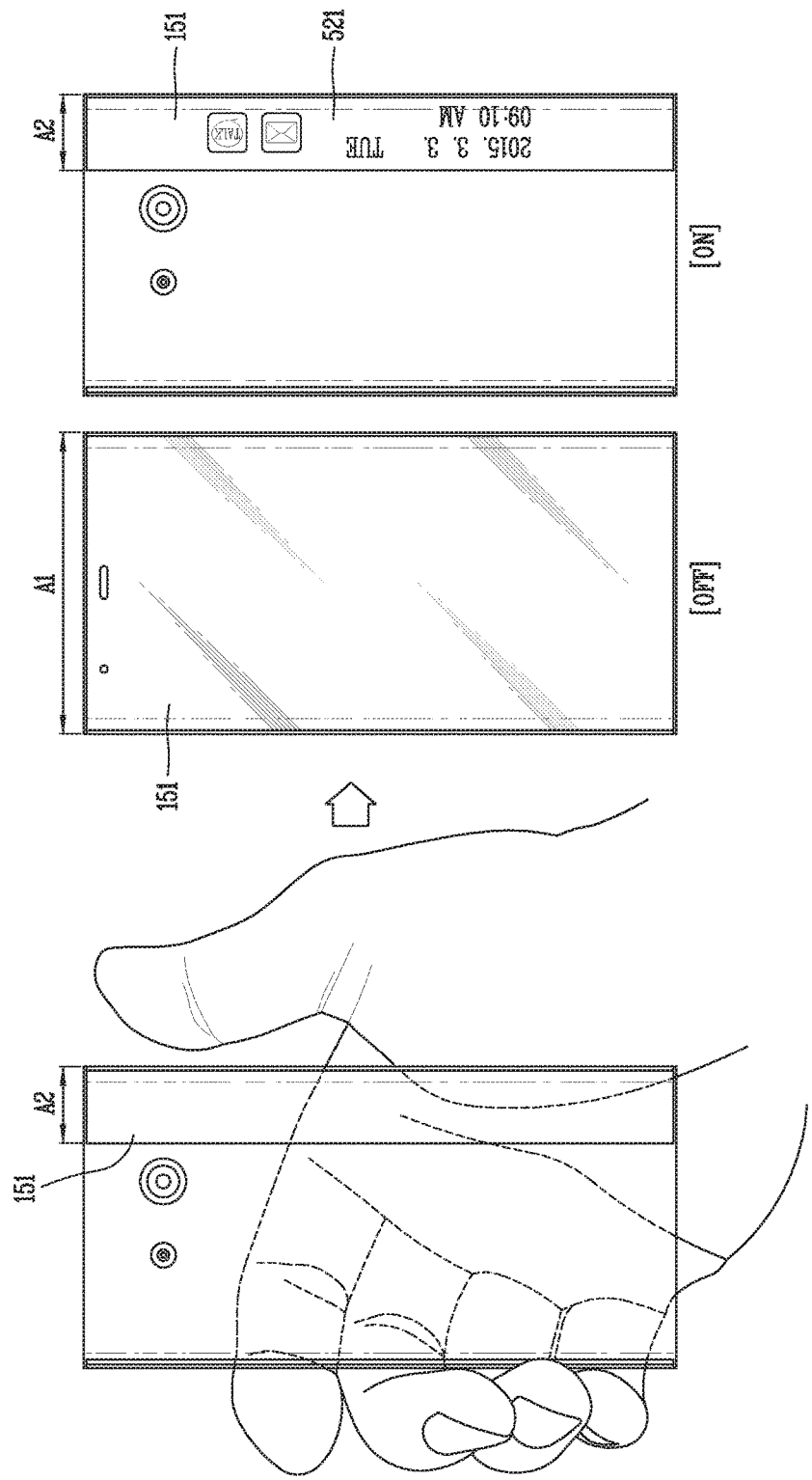

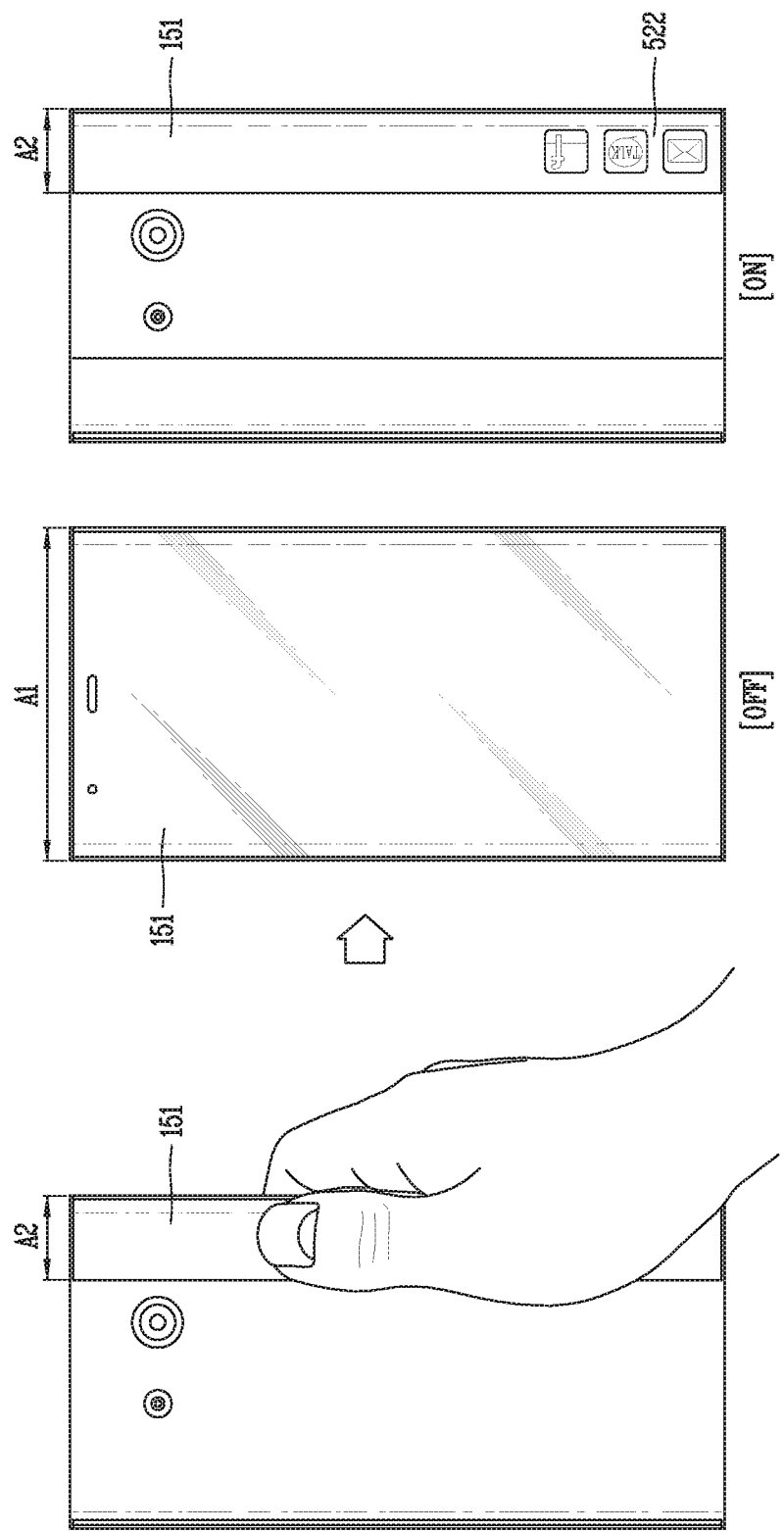

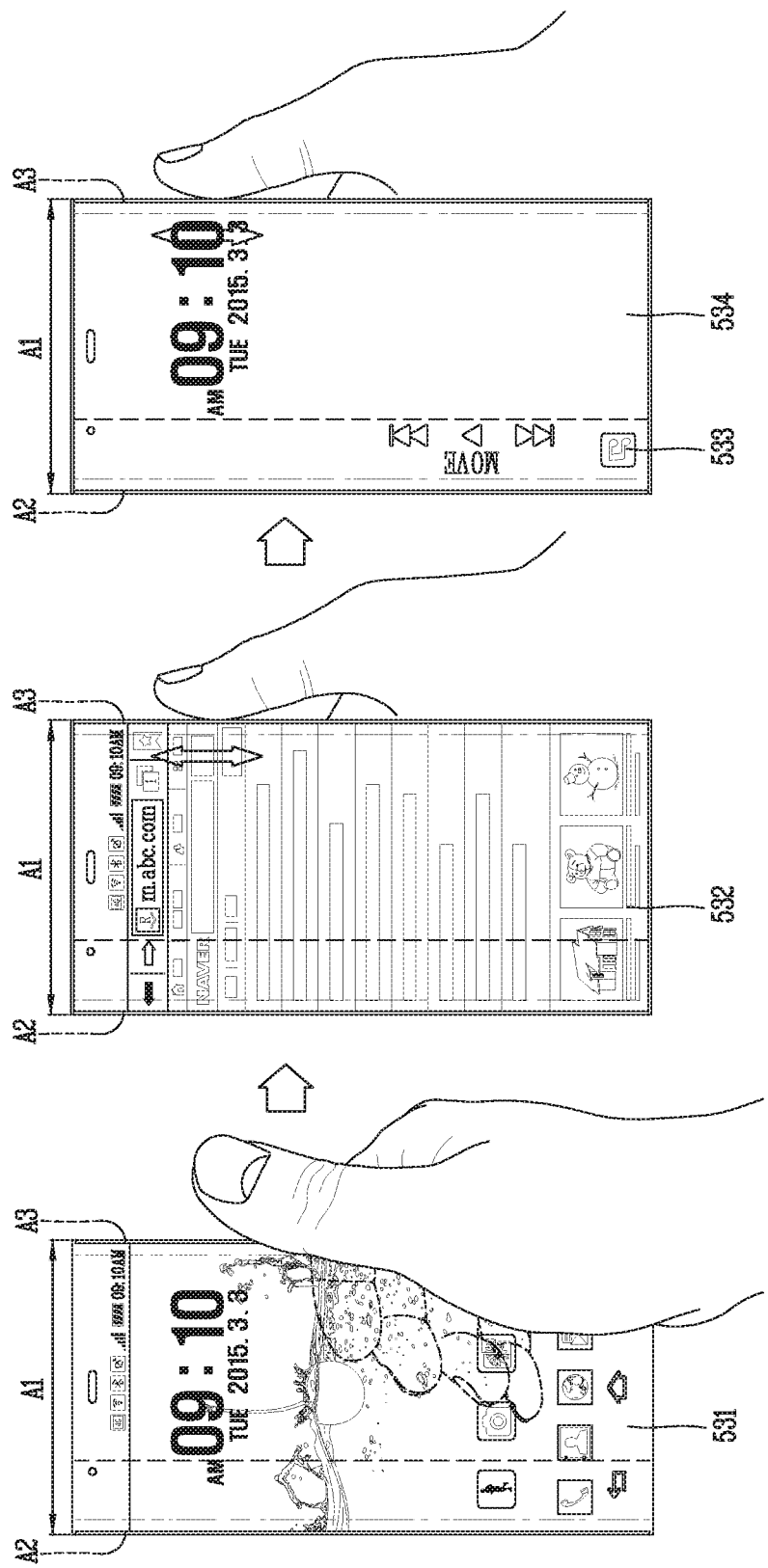

ELECTRONIC DEVICE AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0081306, filed on Jun. 27, 2017, the contents of which are all hereby incorporated by reference herein in its entirety.

BACKGROUND OF THE INVENTION

1. Field of the Invention

This specification relates to an electronic device having a minimized bezel portion.

2. Background of the Invention

Electronic devices may be generally classified as mobile/portable electronic devices or stationary electronic devices according to their mobility. Electronic devices may also be classified as handheld electronic devices or vehicle mounted electronic devices according to whether or not a user can directly carry the electronic device.

Electronic devices have become increasingly more functional. Examples of such functions include capturing images and video, playing music files or video files, playing games, receiving broadcasts, etc. The electronic devices are configured as multimedia players. Efforts are ongoing to support and increase the functionality of the electronic devices. Such efforts include software and hardware improvements, as well as changes and improvements in the structural components.

Recently, in order to increase a display region of the electronic device, a display module is formed to receive a control signal, and includes a circuit portion which does not output an image. The circuit portion should be blocked by a case, etc., and the case, etc. need a bezel portion for fixing and supporting the display module and a window. Thus, there is a structural limitation in completely reducing the bezel portion.

SUMMARY OF THE INVENTION

Therefore, an aspect of the detailed description is to provide an electronic device provided with a display unit including a curved portion.

To achieve these and other advantages and in accordance with the purpose of this specification, as embodied and broadly described herein, there is provided an electronic device, comprising: a body formed to have a front surface, a rear surface and side surfaces; a display unit including a window, a touch sensor and a display panel which constitute a part of an appearance of the body; a proximity sensor disposed near the display unit; and a controller configured to generate a control command based on a touch input applied to the display unit, wherein the display unit includes: a first region which forms the front surface of the body; a second region extended from the first region to one region of the rear surface, and including a curved region; and a third region formed on one region of the side surfaces by being extended from the first region, and formed as a curved region, wherein the controller controls the display unit to output specific screen information to the first region, if a touch input applied to the second region is sensed, or if an object disposed near the second region is sensed, and wherein the controller controls the display unit to output specific screen information to the second region, if a touch input applied to the first region is sensed, or if an object disposed near the first region is sensed.

In an embodiment, the electronic device may further comprise a motion sensor for sensing a movement of the body, and the controller may control the display unit to output the specific screen information to the second region, based on a movement of the body. Thus, a user may be provided with proper screen information on one region of the display unit which is being viewed by the user.

In an embodiment, if first screen information and and second screen information are output to the first and second regions, and if the first screen information and the second screen information are formed of a plurality of different icons, the controller may output the second screen information to the first region based on a dragging touch input applied to the first region, and may control the display unit not to output a part of the first screen information any longer. Thus, a user may output screen information displayed on the second region to the first region, without overturning the electronic device.

Effects of the Present Invention

In the present invention, since a bezel portion which encloses the display unit is minimized due to the curved region of the display panel, a larger display region may be implemented on the front surface of the body.

Further, a larger display region may be implemented by the curved region extended to the front surface, the side surfaces and the rear surface of the body of the electronic device. And screen information is displayed on a specific region as a touch input applied to the first region and a movement of the body are sensed. This may allow a user to be provided with desired information on a proper region.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 2D and 2E are conceptual views for explaining a control method of the display unit in a third mode;

FIGS. 3A to 3D are conceptual views for explaining a control method for controlling an electronic device according to another embodiment of the present invention;

DETAILED DESCRIPTION OF THE INVENTION

Figure 1A:
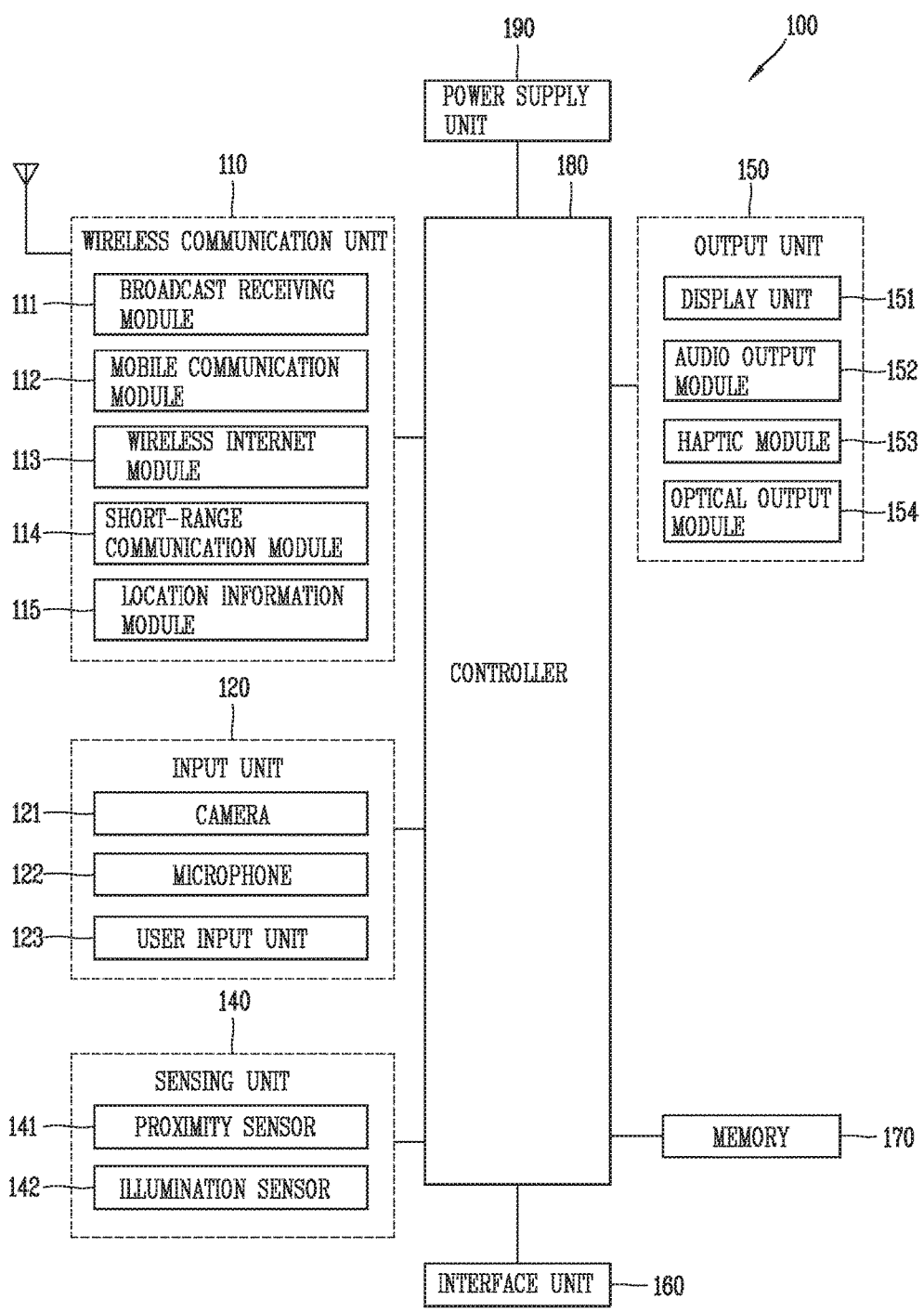
FIG. 1A is a block diagram of an electronic device according to the present invention.

FIG. 1A is a block diagram of an electronic device 100 in accordance with the present disclosure.

The electronic device 100 is shown having components such as a wireless communication unit 110, an input unit 120, a sensing unit 140, an output unit 150, an interface unit 160, a memory 170, a controller 180, and a power supply unit 190. It is understood that implementing all of the components illustrated in FIG. 1 is not a requirement, and that greater or fewer components may alternatively be implemented.

The electronic device 100 is shown having wireless communication unit 110 configured with several commonly implemented components. For instance, the wireless communication unit 110 typically includes one or more components which permit wireless communication between the electronic device 100 and a wireless communication system or network within which the electronic device is located.

The wireless communication unit 110 typically includes one or more modules which permit communications such as wireless communications between the electronic device 100 and a wireless communication system, communications between the electronic device 100 and another electronic device, communications between the electronic device 100 and an external server. Further, the wireless communication unit 110 typically includes one or more modules which connect the electronic device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the electronic device, the surrounding environment of the electronic device, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control overall operation of the electronic device 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the electronic device 100. The power supply unit 190 may include a battery, and the battery may be configured to be embedded in the body, or configured to be detachable from the body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device 100, or communications between the electronic device and a network where another electronic device 100 (or an external server) is located, via wireless area networks. One example of the wireless area networks is a wireless personal area networks.

In some embodiments, another electronic device (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device.

As one example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module.

The input unit 120 may be configured to permit various types of input to the electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the electronic device 100. As another example, the cameras 121 may be located in a stereoscopic arrangement to acquire left and right images for implementing a stereoscopic image.

The microphone 122 is generally implemented to permit audio input to the electronic device 100. The audio input can be processed in various manners according to a function being executed in the electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the electronic device 100. The user input unit 123 may include one or more of a mechanical input element (for example, a key, a button located on a front and/or rear surface or a side surface of the electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like. The controller 180 generally cooperates with the sending unit 140 to control operation of the electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the electronic device 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control the general operations of the electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the electronic device 100. The power supply unit 190 may include a battery, which is typically rechargeable or be detachably coupled to the body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
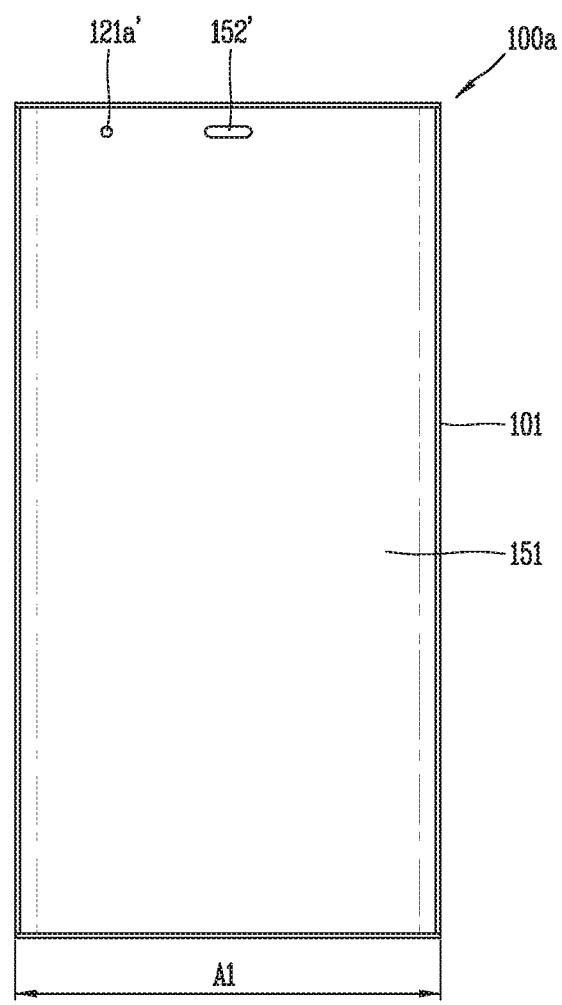
FIGS. 1B and 1C are conceptual views illustrating an example of an electronic device according to the present invention, which are viewed from different directions.
Figure 1C:
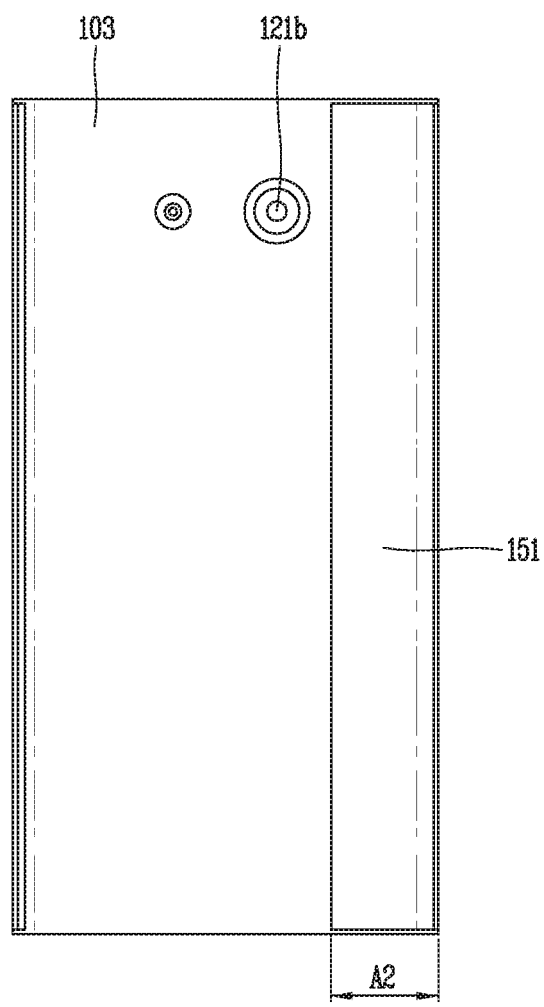

Referring now to FIGS. 1B and 1C, the electronic device 100 is described with reference to a bar-type body. However, the electronic device 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of electronic device (for example, bar-type, watch-type, glasses-type, and the like). However, such teachings with regard to a particular type of electronic device will generally apply to other types of electronic devices as well.

The electronic device 100 will generally include a case (for example, frame, housing, cover, and the like) forming the appearance of the electronic device. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the body to output information. As illustrated, a window 151a of the display unit 151 may be mounted to the front case 101 to form the front surface of the body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the electronic device 100 may be configured such that one case forms the inner space. In this example, an electronic device 100 having a uni-body is formed in such a manner that synthetic resin or metal extends from a side surface to a rear surface.

If desired, the electronic device 100 may include a waterproofing unit (not shown) for preventing introduction of water into the body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The electronic device may be provided with the display unit 151, first and second audio output units 152a, 152b, the proximity sensor 141, the illumination sensor 142, the optical output module 154, front and rear cameras 121a, 121b, first and second manipulation units 123a, 123b, the microphone 122, the interface unit 160, etc.

Figure 1D:
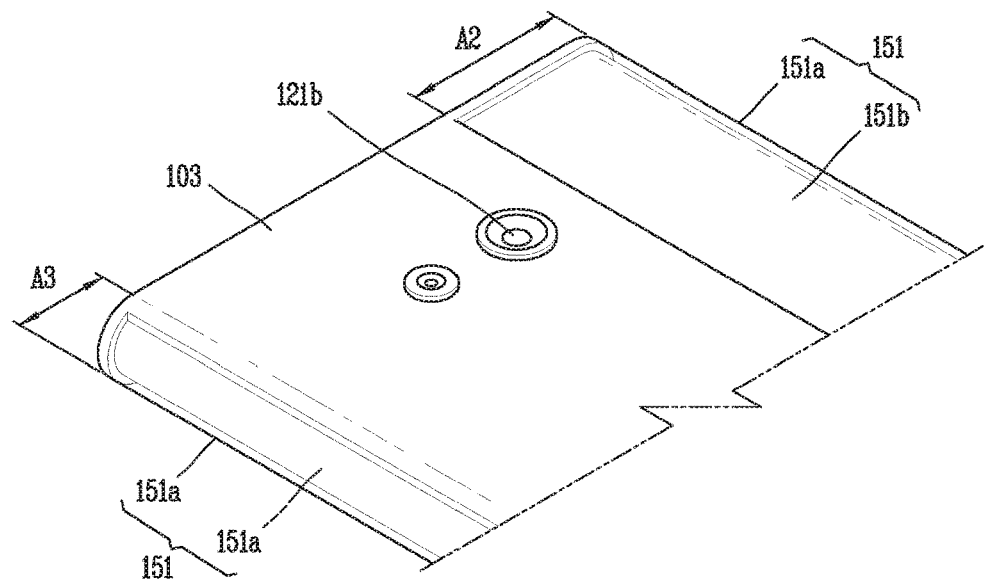
FIGS. 1D and 1E are partial views showing a rear surface of an electronic device in different directions.
Figure 1E:
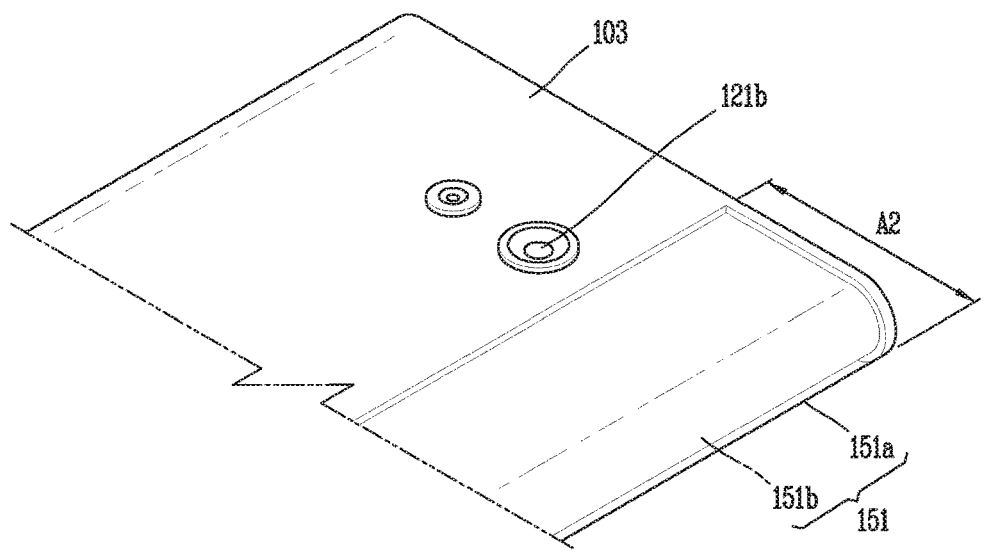

FIGS. 1B and 1C are conceptual views illustrating a front surface and a rear surface of an electronic device 100a according to an embodiment of the present invention. And FIGS. 1D and 1E are partial views showing the rear surface of the electronic device in different directions.

The electronic device 100a shown in FIGS. 1B to 1E includes the display unit 151 including a curved surface. The display unit 151 includes a window 151a which forms an appearance, and a display panel 151b disposed below the window 151a and configured to output an image.

The display unit 151 according to this embodiment includes a first region (A1) which forms a front surface of the electronic device 100a, a second region (A2) extended from the first region (A1) towards a first side surface and including a curved surface, and a third region (A3) extended from the first region (A1) towards a second side surface facing the first side surface and including a curved surface.

The second region (A2) is extended up to one region of the rear surface of the body of the electronic device 100a. The second region (A2) includes a curved region which encloses a side surface of the body, and a flat region disposed on the rear surface of the body. The third region (A3) is disposed on the second side surface of the body with a curved surface. The second region (A2) may be formed near the rear camera 121b disposed on the rear cover 103. An area of the second region (A2) is smaller than that of the first region (A1), and an area of the third region (A3) is smaller than that of the second region (A2).

The second and third regions (A2, A3) are bent from the first region (A1), and curvatures of the curved regions of the second and third regions (A2, A3) may be different from each other.

The first region (A1) of the display unit 151 may include the front camera 121a, and first and second openings 121a', 152' formed at a region corresponding to the audio output unit 152.

The display panel 151b which forms the first to third regions (A1, A2, A3) is bent such that both edges thereof have different lengths. A recess region for mounting the display unit 151 including the curved surface is formed at each of a side surface of the first case 101 and the rear cover 103.

The first to third regions (A1, A2, A3) of the display unit 151 correspond to display regions for outputting images. The display unit 151 includes a touch sensor. Thus, the controller 180 may generate a control command based on a touch input applied to the first to third regions (A1, A2, A3) of the display unit 151.

Hereinafter, a control method using the display unit 151 including the first to third regions (A1, A2, A3) will be explained.

Figure 2A:
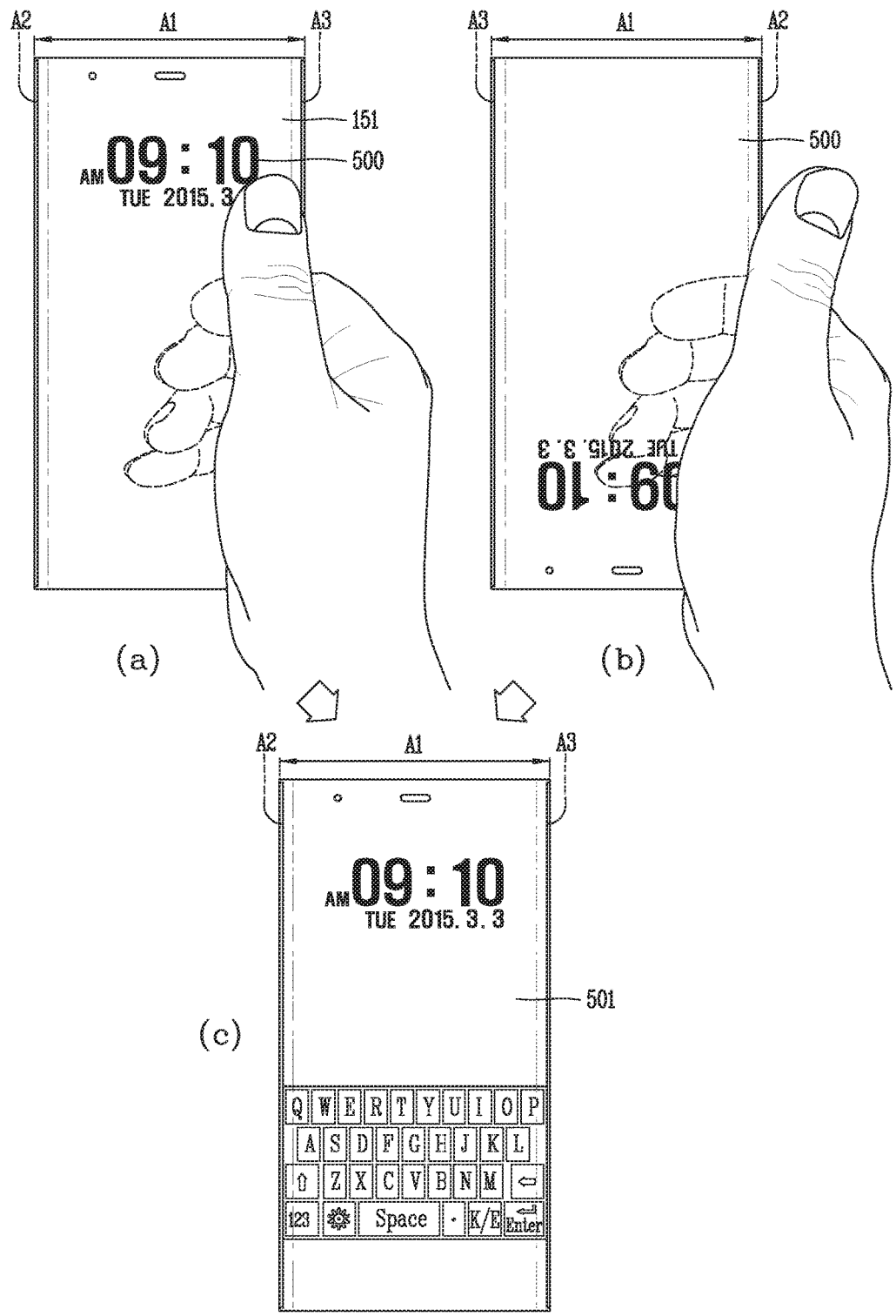
FIGS. 2A and 2B are conceptual views for explaining a control method of a display unit in a first mode.
Figure 2B:
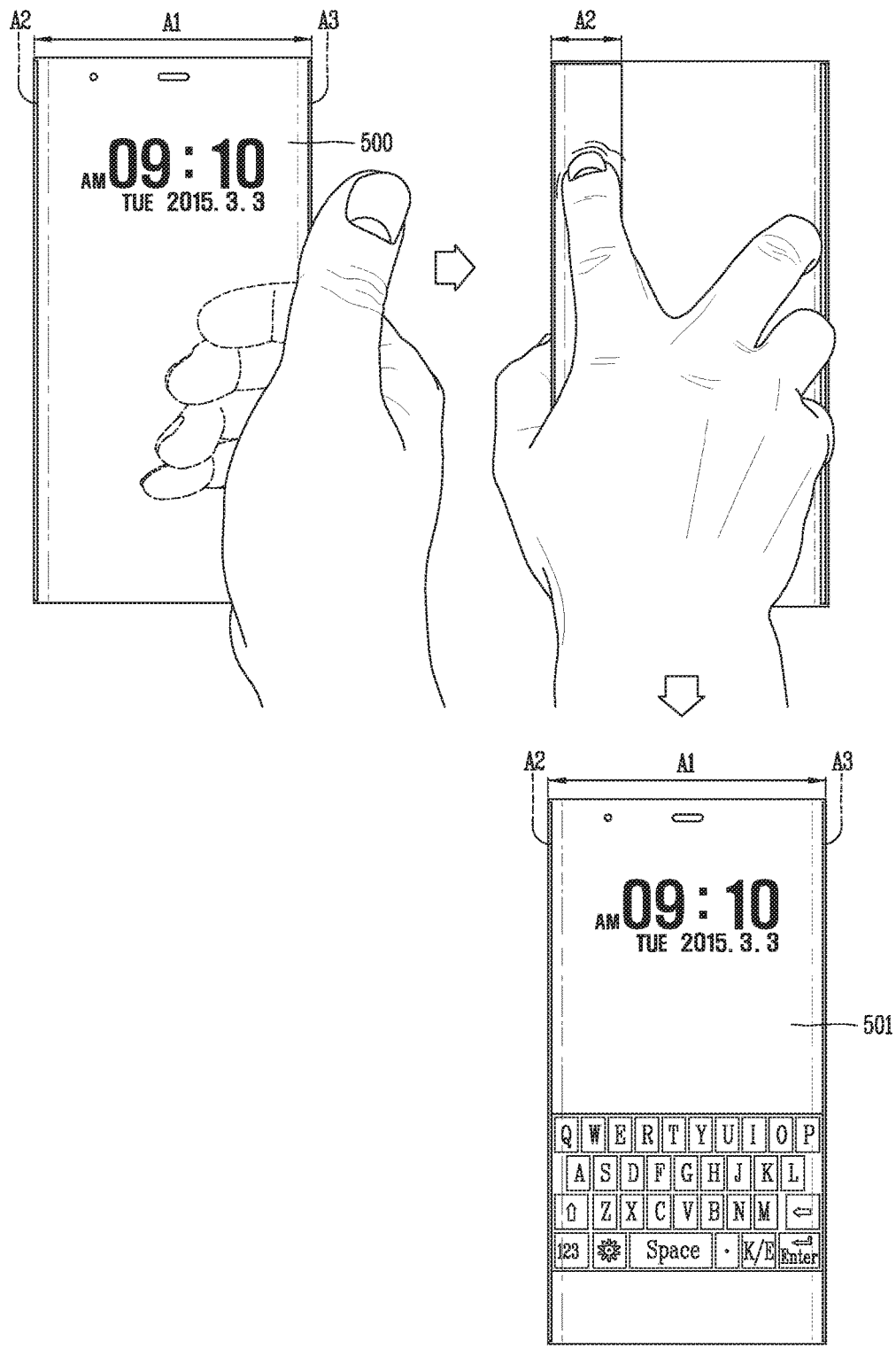

FIGS. 2A and 2B are conceptual views for explaining a control method of the display unit in a first mode.

The sensing unit 140 of the electronic device 100 according to the present invention includes the proximity sensor 141, an acceleration sensor, a gravitational sensor (G-sensor), and a gyroscope sensor.

The controller 180 may control an activated state of the display unit 151 using a motion sensor including the acceleration sensor, the gravitational sensor (G-sensor), and the gyroscope sensor. For instance, the controller 180 may deactivate the display unit 151 when the body of the electronic device 100 is disposed on a ground surface. Alternatively, when it is sensed that the electronic device 100 is disposed on a ground surface, the controller 180 may control only AOD to be output to the display unit 151. When it is sensed by the motion sensor that the body of the electronic device has been moved or is in a gripped state by a user, the controller 180 may activate the display unit 151. That is, a specific image may be output to at least one of the first to third regions (A1, A2, A3) of the display unit 151, based on a movement of the body.

The controller 180 may activate at least one of the first to third regions (A1, A2, A3) based on a touch input applied to one region of the display unit 151. Alternatively, if it is sensed by the proximity sensor that a finger (or a specific object) is near one region of the display unit 151, the controller 180 may activate the one region to output a specific image thereto.

Referring to FIG. 2A, the display unit 151 does not output an image in a deactivated state, or outputs an AOD image 500. The AOD image 500 corresponds to specific information displayed on the partial region when the display unit 151 is in a locked state. For instance, the AOD image 500 may include time information, date information, information on a received event, etc.

Referring to FIGS. 2A(a) and (c), the controller 180 controls specific screen information 501 to be output to the display unit 151 in a first mode. The first mode may be activated based on a touch input applied to the second region (A2), or may be activated when it is sensed by the proximity sensor that an object is near the second region (A2).

The controller 180 controls the display unit 151 to output the specific screen information 501 to the first region (A1) in the first mode. And the controller 180 controls the second and third regions (A2, A3) to maintain a deactivated state. First screen information may correspond to a lock screen when the electronic device 100 is in a locked state, a home screen page, an execution screen of a recently-activated application, etc.

Referring to FIG. 2A, FIG. 2A(b) shows a deactivated state of the display unit 151, or an output state of the AOD image 500 to the first region (A1).

The controller 180 controls the display unit 151 to output the specific screen information 501 to the first region (A1), if it is sensed that a touch input has been applied to the third region (A3), or if it is sensed by the proximity sensor that an object is near the third region (A3).

That is, if a user grips the body in order to use the electronic device 100, the display unit may be converted into a standby mode even if the user does not apply an additional control command by activating the first region (A1) disposed on the front surface.

Referring to FIG. 2B, when the display unit 151 is in a deactivated state or when the AOD image 500 is output, the controller 180 senses a touch input and/or a knock input applied to the second region (A2).

The controller 180 activates the first mode when a specific type of touch input and/or a knock input applied to the second region (A2) is sensed. In the first mode, the specific screen information 501 is output to the first region (A1) of the display unit 151 in the first mode.

In the first mode, the second and third regions (A2, A3) may maintain a deactivated state, or an AOD image may be output to at least one of the second and third regions (A2, A3). Alternatively, an image may not be output as a touch sensor of the second and third regions (A2, A3) is activated. In this case, a control command may be generated based on a touch input applied to the second and third regions (A2, A3).

Figure 2C:
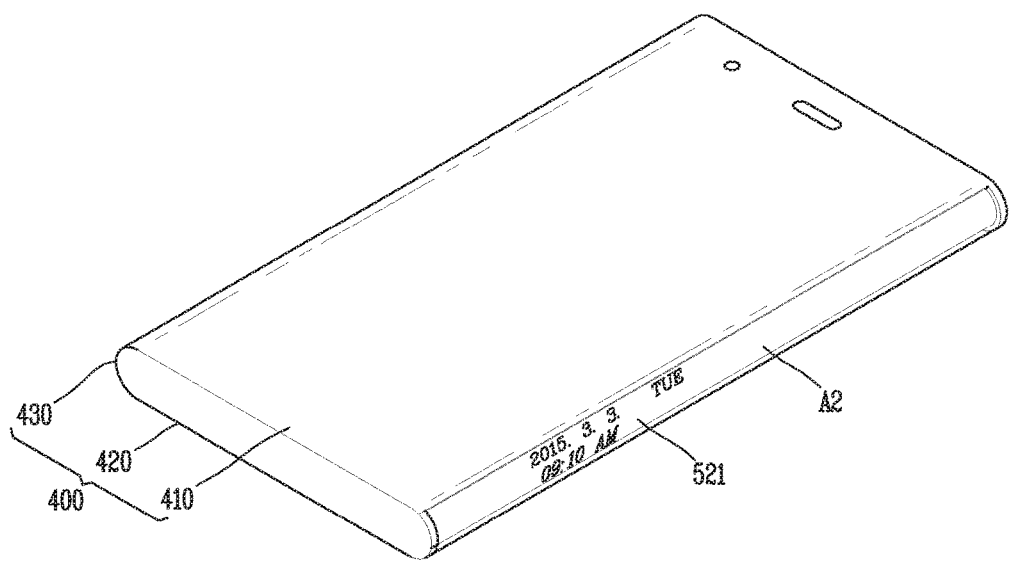
FIG. 2C is a conceptual view for explaining a control method of the display unit when a case is mounted.
Figure 2C:
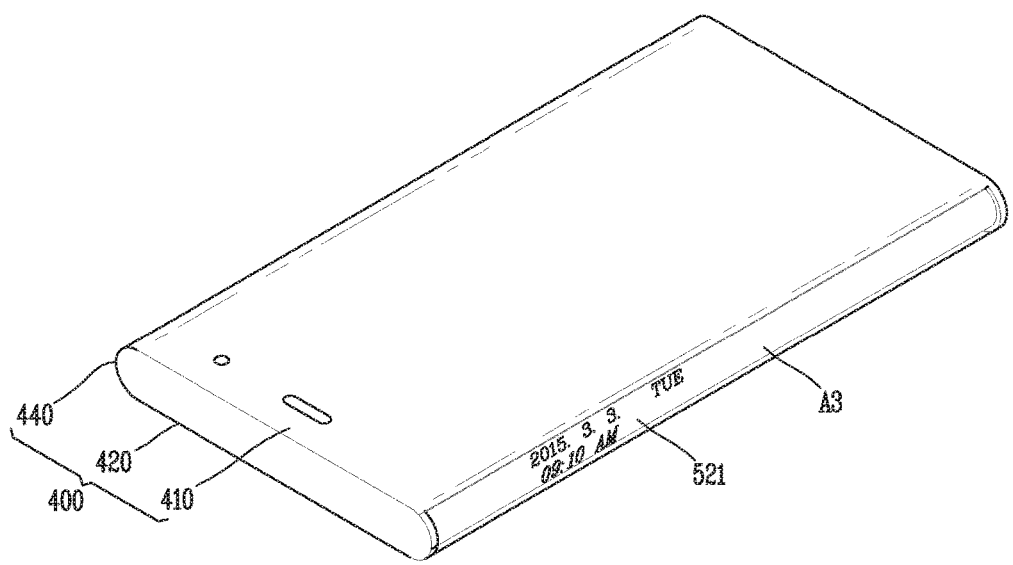

FIG. 2C is a conceptual view for explaining a control method of the display unit when a case is mounted.

Referring to FIG. 2C(a), a case 400 may be mounted to the body of the electronic device 100. The case 400 may include a first member 410 for covering a front surface where the first region (A1) is arranged, a second member 420 for covering a rear surface where a partial region of the second region (A2) is arranged, and a third member 430 for connecting the first and second members 410, 420 to each other and covering the third region (A3). In a fixed state of the second member 420 to the rear surface, a region blocked by the first and second members 410, 420 may be exposed in an open state. In a closed state of the case 400, the remaining region of the second region (A2) of the display unit 151 may be exposed to the outside. The remaining region of the second region (A2) corresponds to a partial region formed on a side surface of the body.

Referring to FIG. 2C(b), the case 400 include a first member 410 for covering the front surface, a second member 420 for covering the rear surface, and a fourth member 440 for connecting the first and second members 410, 420 to each other and covering the remaining region of the second region. In an open state of the case 400, the first region (A1), the remaining region of the second region, and the third region (A3) may be exposed to the outside. In a closed state of the case 400, the third region (A3) may be exposed to the outside.

The second mode is configured as the closed state. In the second mode, the controller 180 controls the display unit 151 to output an AOD image 521 to one region of the display unit 151 exposed in the closed state.

The proximity sensor is disposed near the first region (A1), and whether the first member 410 is near the proximity sensor or not is sensed by the proximity sensor. Thus, the controller may determine whether the case is in a closed state or not.

If the case shown in FIG. 2C(a) is mounted to the body, the controller 180 controls the display unit 151 to output the AOD image 521 to the remaining region of the second region (A2) which is disposed on the side surface of the body. If the case shown in FIG. 2C(b) is mounted to the body, the controller 180 controls the display unit 151 to output the AOD image 521 to the third region (A3).

With such a configuration, a user may be continuously provided with specific information through one region of the display unit 151 formed on a side surface of the body, without converting the case to an open state.

FIGS. 2D and 2E are conceptual views for explaining a control method of the display unit in a third mode.

Referring to FIG. 2D, the controller 180 may activate the second region (A2) based on a touch input applied to the first region (A1), and/or motion information sensed by the motion sensor. And the controller 180 may control the display unit 151 to output the AOD image 521.

The controller 180 may activate the second region (A2) based on a touch range of a touch input applied to the first region (A1). That is, the controller 180 may determine whether a touch input corresponds to a control command applied to the display unit 151 or a touch for supporting the body, based on a touch range of the touch input applied to the first region (A1).

The controller 180 controls the display unit 151 to convert the first region (A1) into a deactivated state based on a touch range of a touch input applied to the first region (A1) and/or a posture of the body, and controls the display unit 151 to output the AOD image 521 to at least part of the second region (A2).

Referring to FIG. 2E, the controller 180 may output specific screen information to the second region (A2) based on whether a touch input is sensed on the second region (A2) while a touch input is applied to the first region (A1).

The controller 180 controls the display unit 151 to output specific screen information 522 when a specific type of touch input (e.g., a long touch input, a multi touch input, a knock input, etc.) is applied to the second region (A2). The first region (A1) becomes deactivated.

The specific screen information 522 may have any type. However, the specific screen information 522 may include information on a received event, an icon for an application, information on an application preset by a user, etc.

If a touch input is sensed in a deactivated state where no image is displayed on the display unit 151, the controller 180 may control the display unit 151 to output an AOD image to a specific region.

With such a configuration, one region of the display unit, which is being viewed by a user, may be activated such that proper screen information may be provided thereto more rapidly.

FIGS. 3A to 3D are conceptual views for explaining a method for controlling an electronic device according to another embodiment of the present invention.

Hereinafter, a control method to activate the display unit 151 based on a position on the display unit 151 where a touch input is applied will be explained with reference to FIGS. 3A and 3D.

Figure 3A:
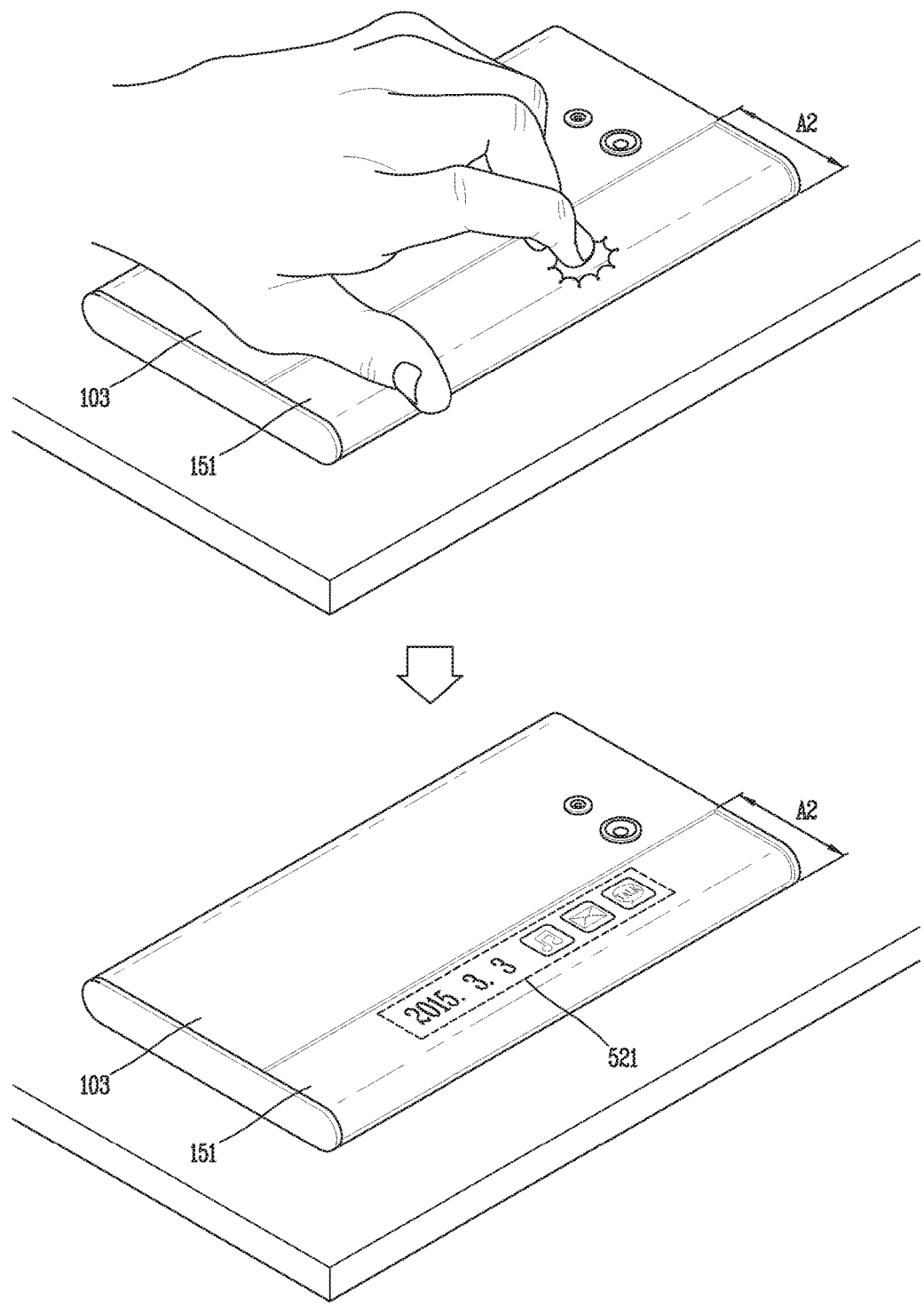

Referring to FIG. 3A, the controller 180 converts the display unit 151 into a deactivated state, if a touch input is not sensed on the display unit 151. If it is determined by the motion sensor that the body is arranged on a ground surface, the controller 180 may convert the display unit 151 into a deactivated state such that no image may be output.

If a specific type of touch input is applied to the second region (A2), the controller 180 controls the display unit 151 to output the screen information 522 to the second region (A2). The specific type of touch input may be a long touch input, a multi touch input, a knock input, etc.

The screen information 522 may include specific information set by a user, current state information (weather, time, battery power level, etc.), or information on an occurred event.

Hereinafter, a control method to activate the display unit 151 based on a touch input applied to the first to third regions (A1, A2, A3) and output screen information will be explained with reference to FIG. 3B.

If a touch input is applied to all of the first to third regions (A1, A2, A3) and first screen information 531 is output to the first region (A1), the controller 180 controls visual data not to be output to the second and third regions (A2, A3), and controls the touch sensor to ignore a touch input applied to the second and third regions (A2, A3).

In this case, the controller 180 may generate a control command only by a touch input applied to the first region (A1), and may prevent information exposure to another person by outputting no visual data to a rear region of the body.

If a touch input is applied to the third region (A3) rather than the first region (A1), in an output state of the first screen information 531 to the first region (A1), the controller controls the second screen information 532 based on the touch input applied to the third region (A3).

Even in this case, the controller 180 may ignore a touch input applied to the second region (A2), and may control the display unit 151 not to output visual data to the second region (A2).

If third screen information 533 is output to the second region (A2) and an AOD image 534 is output to the first region (A1), the controller 180 generates a control command based on a touch input applied to the display unit 151. If a touch input is applied to the first region (A1), the controller 180 activates the first region (A1) and converts the AOD image 534 into specific screen information.

As shown, the controller 180 generates a control command based on a touch input applied to the second and third regions (A2, A3) rather than the first region (A1). For instance, if execution screen information of a specific application is output to the third region (A3) as the third screen information 533, the controller 180 may control the specific application based on a touch input applied to the third region (A3). In this case, the display unit 151 continuously outputs the AOD image 534 to the first region (A1).

For instance, a touch input applied to the third region (A3) is a consecutive touch input for generation of a control command to control a scroll function, a volume level change, a screen enlargement/contraction, etc.

Figure 3C:
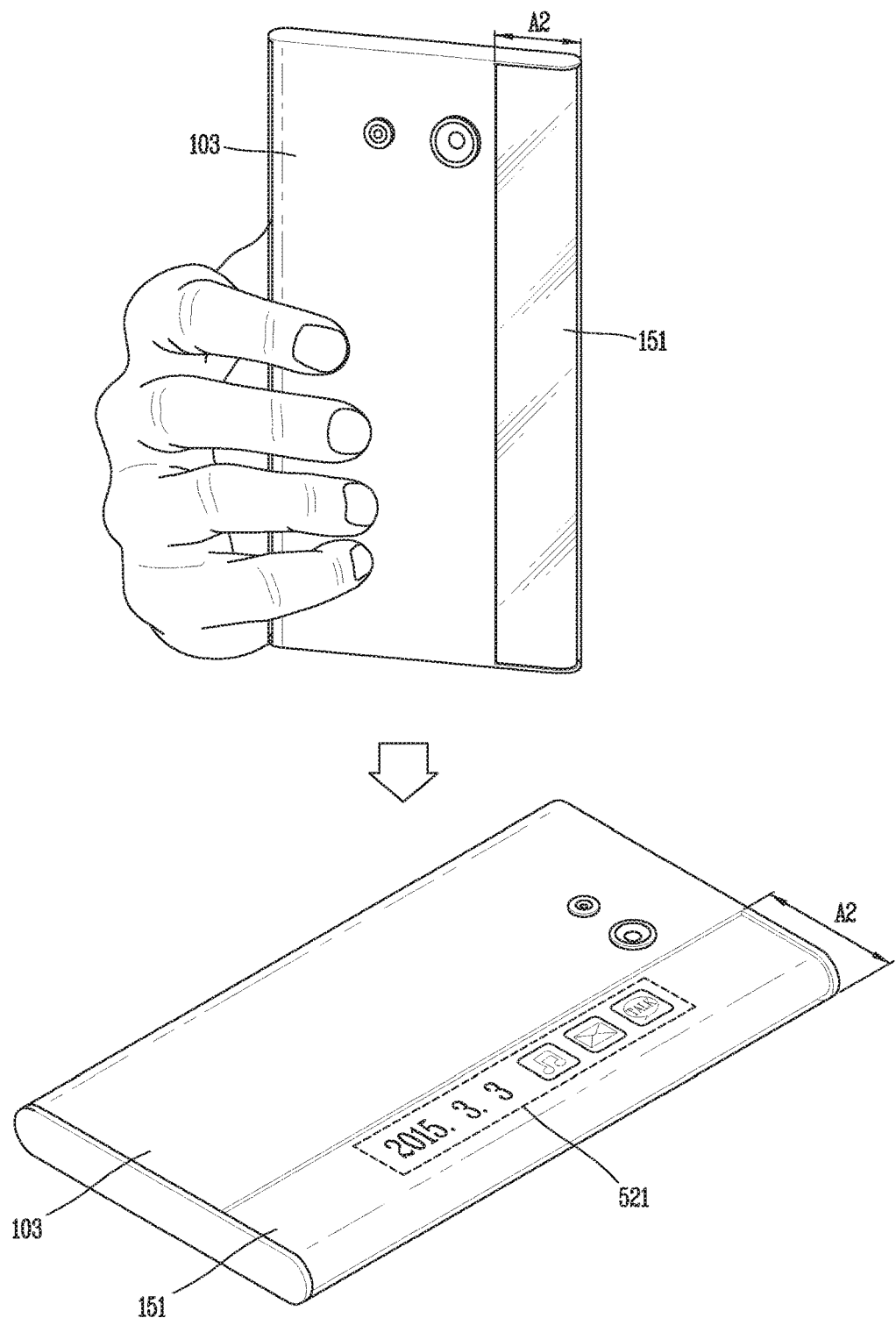
Figure 3D:
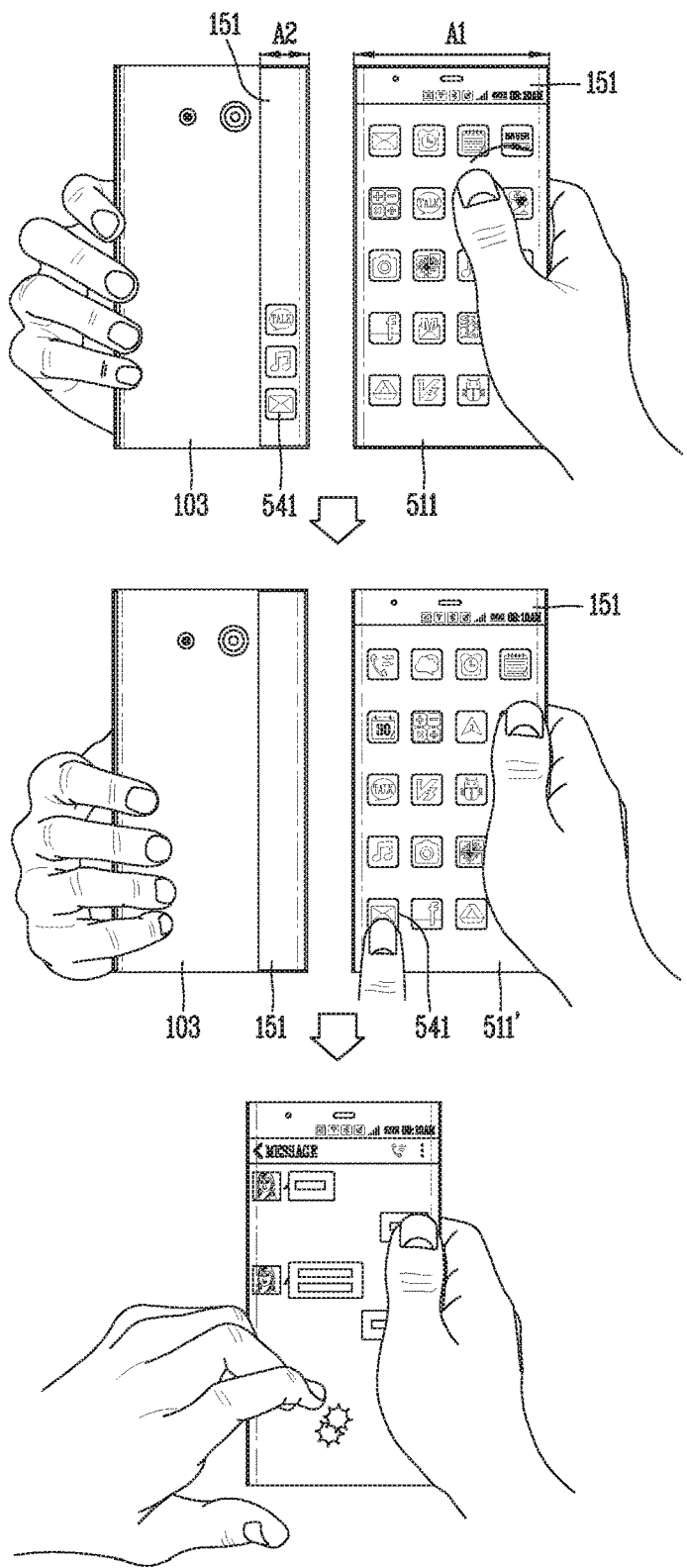

Referring to FIG. 3C, the controller 180 determines a posture of the body of the electronic device 100 by the motion sensor (gyroscope sensor) and/or the proximity sensor.

If it is determined that the body is in a gripped state by a user, the controller 180 controls the display unit 151 not to output visual data to the second region (A2). However, if a user applies a touch input to the second region (A2) with supporting the first region (A1) using his or her hand, specific information is output to the second region (A2).

If it is sensed by the proximity sensor and the motion sensor that the body is disposed on a ground surface in a contacted state of the first region (A1) to the ground surface, the controller 180 controls the display unit 151 to output the AOD image 521 to the second region (A2).

Although not shown, if it is sensed that the body is disposed on a ground surface in a contacted state of the rear surface including the second region (A2) to the ground surface, the controller 180 may output the AOD image 521 to the first region (A1).

Thus, a user may be provided with the AOD image even if the body is in any posture.

Hereinafter, a control method based on a consecutive touch input applied to the display unit 151 will be explained with reference to FIG. 3D.

The display unit 151 outputs first and second screen information 511, 541 including a plurality of icons corresponding to applications, to the first and second regions (A1, A2). The controller may execute an application selected based on a touch input applied to an icon output to the first region (A1).

The controller controls the display unit to output the second screen information 541 displayed on the second region (A2) to the first region (A1), based on a dragging type of touch input applied to the first region (A1). If the dragging type of touch input applied to the first region (A1) is within more than a preset range, the controller outputs the second screen information 541 to a part of the first region (A1) near the second region (A2). Accordingly, the output position of the first screen information 511 is moved. For instance, partial information of the first screen information 511, which is output to a region adjacent to the third region (A3), disappears, and the remaining information has its output position moved. Alternatively, the partial information may be output to the third region (A3).

The first and second screen information 511, 541 may have the same layout. While a layout of the first screen information 511 is maintained, the second screen information 541 is output to the first region (A1).

The controller outputs the remaining information of the first screen information 511 to the first region (A1) together with the second screen information 541, while the dragging type of touch input is maintained. If the dragging type of touch input is released, the first screen information 511 is re-output to the first region (A1).

While the dragging type of touch input is maintained on the first region (A1), the controller may control the electronic device 100 by an additional touch input applied to the first region (A1). For instance, the additional touch input may be a control command for selecting an icon displayed on the first region (A1). The selected icon may be an icon included in the second screen information 541.

The display unit 151 outputs an execution screen of a selected application to the first region (A1).

With such a configuration, a user may temporarily output information displayed on the second region (A2) to the first region (A1), and may control video information displayed on the second region (A2) by using the first region (A1) without overturning the body.

Figure 4A:
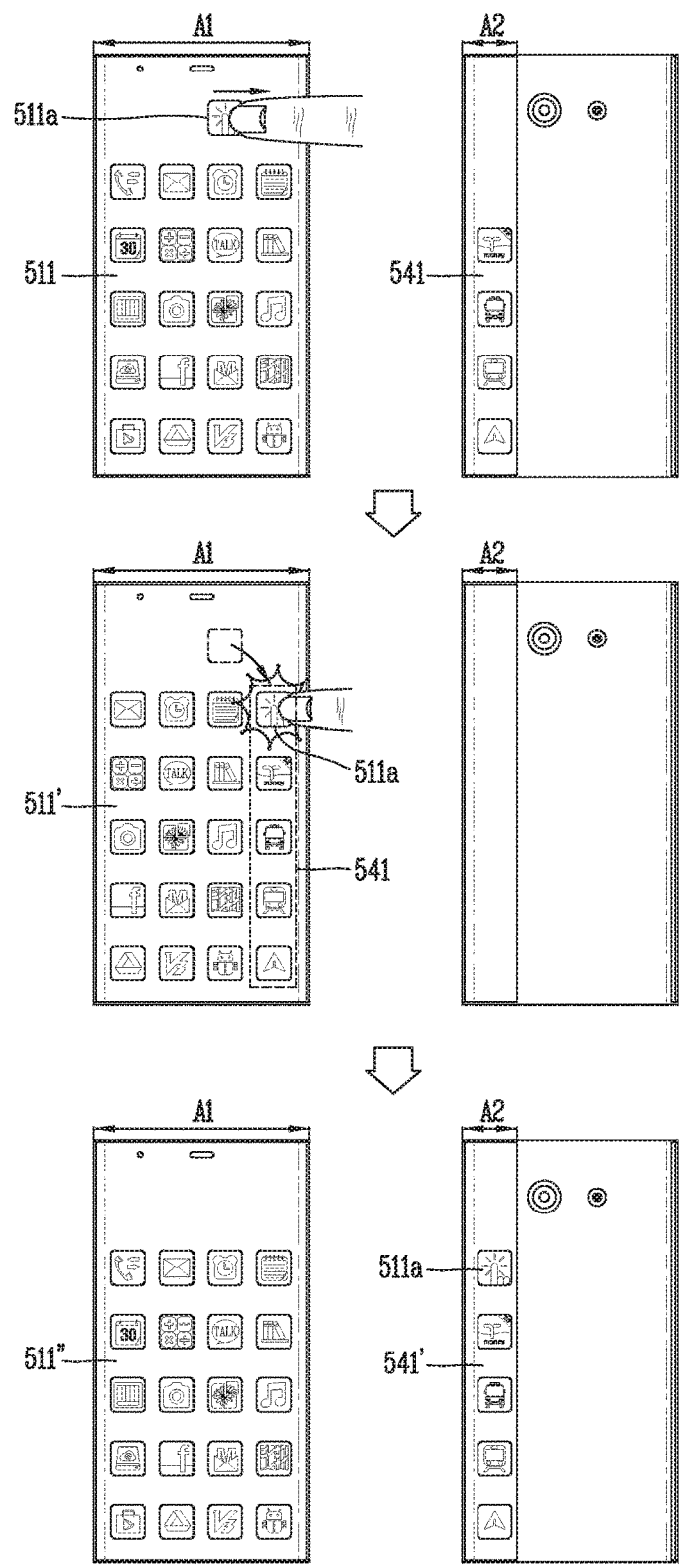
FIGS. 4A and 4B are conceptual views for explaining a control method for editing screen information displayed on first and second regions.
Figure 4B:
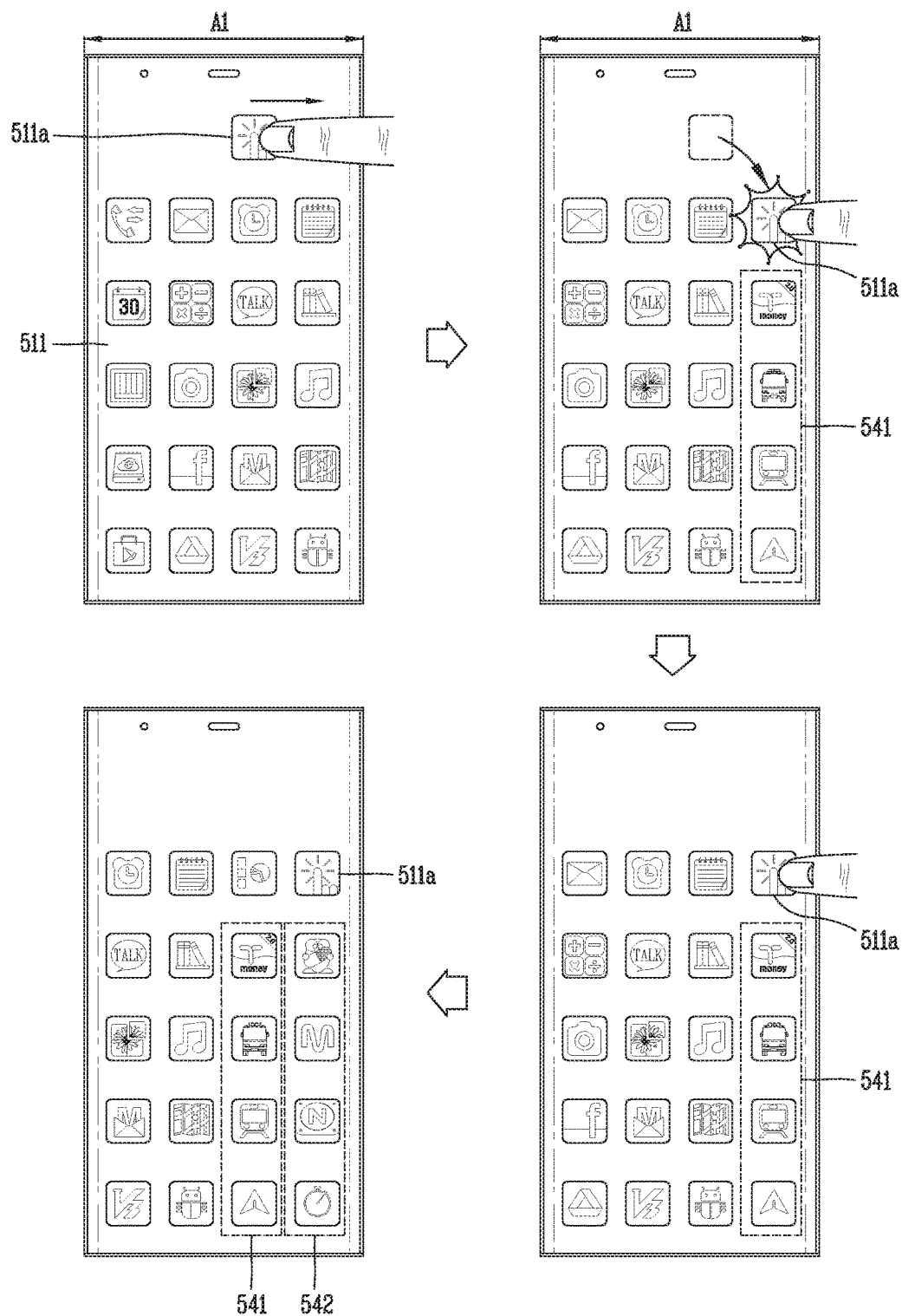

FIGS. 4A and 4B are conceptual views for explaining a control method for editing screen information displayed on first and second regions.

Referring to FIG. 4A, a first region (A1) of the display unit outputs first screen information 511 including a plurality of icons, and a second region (A2) outputs second screen information 541 including at least one icon. The first screen information 511 and the second screen information 541 correspond to home screen pages which can be output consecutively.

If a touch input is applied to one 511a of the plurality of icons, the controller executes an application corresponding to the selected icon 511a, and outputs an execution screen to the first region (A1).

However, if a specific type of first touch input (e.g., a long touch input, a pressure touch, etc.) is applied to the icon 511a, the controller activates an edition mode. The controller controls the display unit to change the output position of the icon 511a, based on a dragging type of second touch input consecutively applied to the icon 511a after the first touch input is applied thereto.

If the second touch input is moved nearer to the second region (A2), the second screen information 541 is output to the first region (A1). As a result, a partial screen 511' formed as one region of the first screen information 511 disappears is output to the first region (A1).

The controller controls the display unit to output the selected icon 511a to the first region (A1) together with the second screen information 541. If the second touch input is released, the controller controls the display unit to output a second edition screen 541' including the icon 511a to the second region (A2), and to output a first edition screen 511" excluding the icon 511a to the first region (A1).

With such a configuration, a user may edit screen information displayed on different regions more easily.

Referring to FIG. 4B, the display unit selectively displays consecutive information on the first and second regions (A1, A2). The first and second screen information displayed on the first and second regions (A1, A2) also correspond to part of consecutive information.

Although not shown, if a first touch input is applied to the first region (A1), visual data may be converted on the first region (A1) by the same amount as screen information displayed on the second region (A2). If a second touch input different from the first touch input is applied to the first region (A1), visual data may be converted on the first region (A1) by the same amount as screen information displayed on the first region (A1).

The controller activates an edition mode based on a specific type of first touch input applied to the icon 511a included in the first screen information 511 on the first region (A1). And the controller outputs the second screen information 541 displayed on the second region (A2) to the first region (A1), based on a second touch input consecutive to the first touch input.

If the second touch input is maintained without being released, the controller outputs third screen information 542 different from the second screen information 541 to the first region (A1). The second screen information 541 moves on the first region (A1), and a remaining region obtained as additional information of the first screen information 511 disappears is output to the first region (A1). An output range of the third screen information 542 on the display unit may be substantially the same as an output range of the second screen information 541 (the amount of information, i.e., the number of icons may be differently set).

The first to third screen information 511, 541, 542 may correspond to information consecutive to each other. Information output to the first region (A1) by the second touch input is not limited to the first to third screen information 511, 541, 542. While the second screen information 541 is output to the first region (A1), the second screen information 542 is displayed on the second region (A2).

With such a configuration, a user needs not apply a control command to the second region by overturning the body when editing consecutive screen information.

FIGS. 5A to 5F are views for explaining a structure of an electronic device according to another embodiment of the present invention.

Figure 5A:
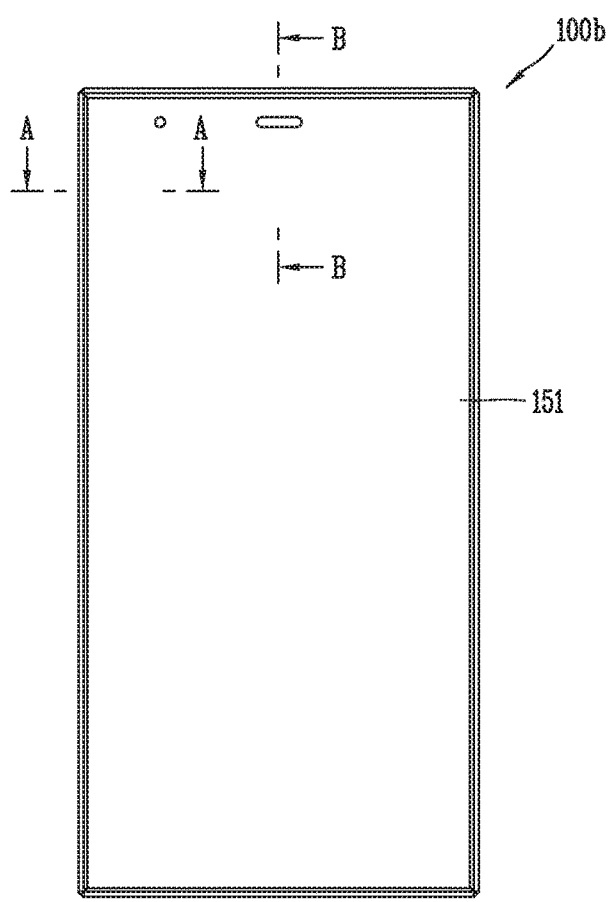
FIGS. 5A to 5F are views for explaining a structure of an electronic device according to another embodiment of the present invention.
Figure 5B:
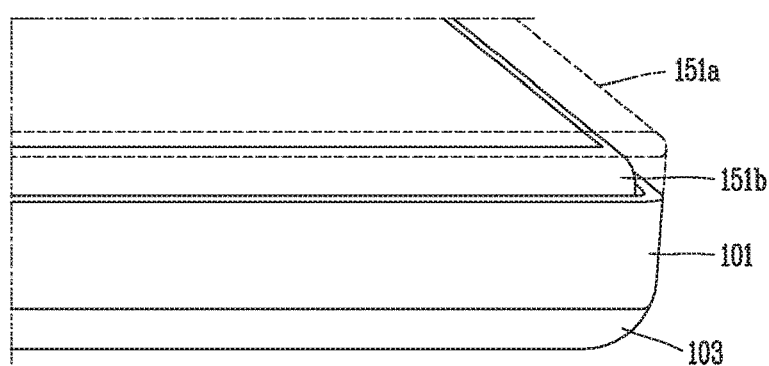

FIG. 5A is a conceptual view showing a front surface of an electronic device 100b, and FIG. 5B is an enlarged view of a part of the electronic device shown in FIG. 5A.

Referring to FIGS. 5A and 5B, a bezel portion which encloses an edge of the display unit 151 is not formed on the front surface of the electronic device 100b. The appearance of the front surface is implemented by the window 151a included in the display unit 151.

The front surface of the electronic device 100b is formed by the window 151a, and a rear surface is formed by the rear cover 103. And the electronic device 100b includes a front case 101 coupled to the window 151*a* and the rear cover 103 and forming side surfaces of the body.

Edges of a display panel 151*b* are arranged in a folded state towards the inside of the front case 101. The window 151*a* is formed to cover not only a display region of the display panel 151*b* which outputs an image, but also a curved region bent from the display region.

The window 151*a* includes a front region, and a side region bent from the front region. End parts of the side region are fixed to the front case 101. Edges of the front case 101 include stair-shaped portions for mounting the window 151*a* thereto.

Figure 5C:
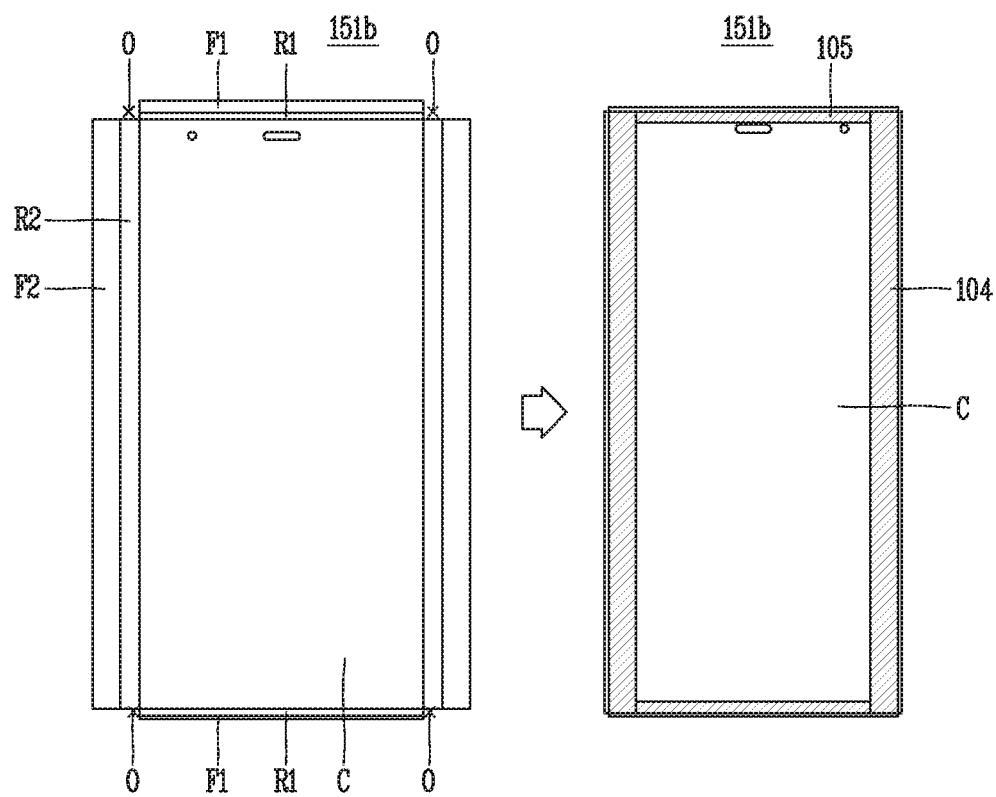
Figure 5D:
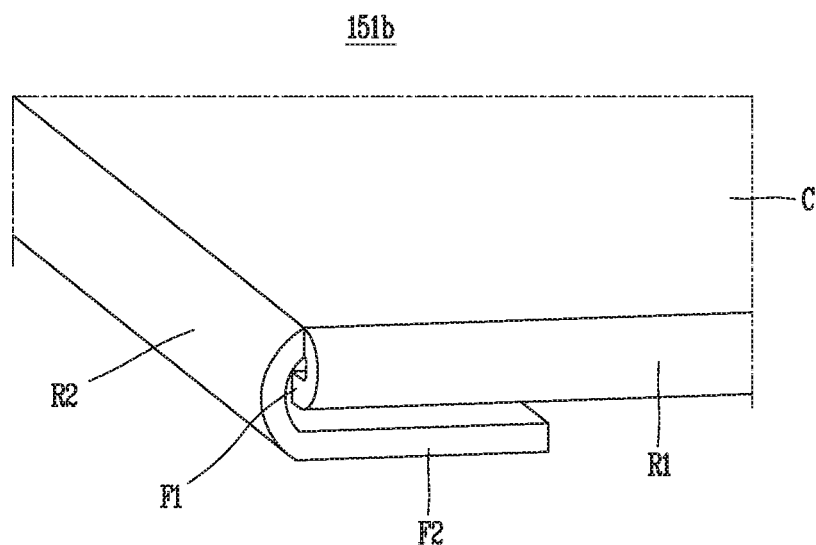

Referring to FIGS. 5C and 5D, the display panel 151*b* includes a display region (c), first and second curved regions (R1, R2) extended from the display region (c), and first and second bent regions (F1, F2) extended from the first and second curved regions (R1, R2). The first and second curved regions (R1, R2) are extended from 4 edges of the display region (c). Thus, open regions (o) not connected to the first and second curved regions (R1, R2) and the first and second bent regions (F1, F2) are formed at the 4 edges of the display region (c).

The first curved region (R1) forms a curved surface by being bent towards a rear surface of the display region (c), and the first bent region (F1) is arranged to be overlapped with the display region (c). The first curved region (R1) is bent to have a first curvature.

In a state that the first curved region (R1) and the first bent region (F1) are folded on the basis of the display region (c), the second curved region (R2) and the second bent region (F1) are bent. The second curved region (R2) and the second bent region (F2) are bent on the first curved region (R1) and the first bent region (F1). A second curvature of the second curved region (R2) is formed to be smaller than the first curvature. That is, the first and second bent regions (F1, F2) are arranged to be overlapped with each other.

An image is not output to the first and second bent regions (F1, F2), and a circuit configuration for transmitting a signal is formed at the first and second bent regions (F1, F2).

An adhesive member may be formed at the first and second bent regions (F1, F2) for adhesion of the first and second bent regions (F1, F2) to the front case 101 of the body.

Figure 5E:
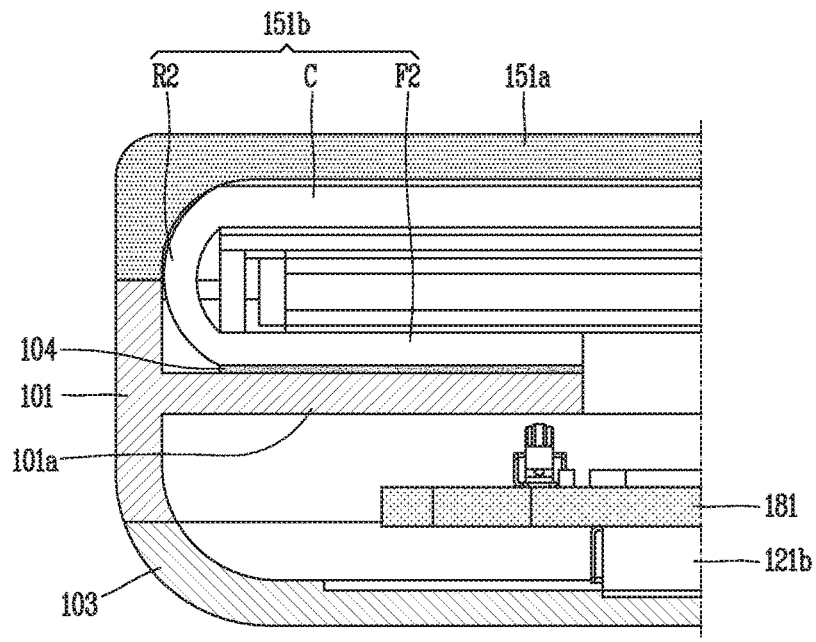
Figure 5F:
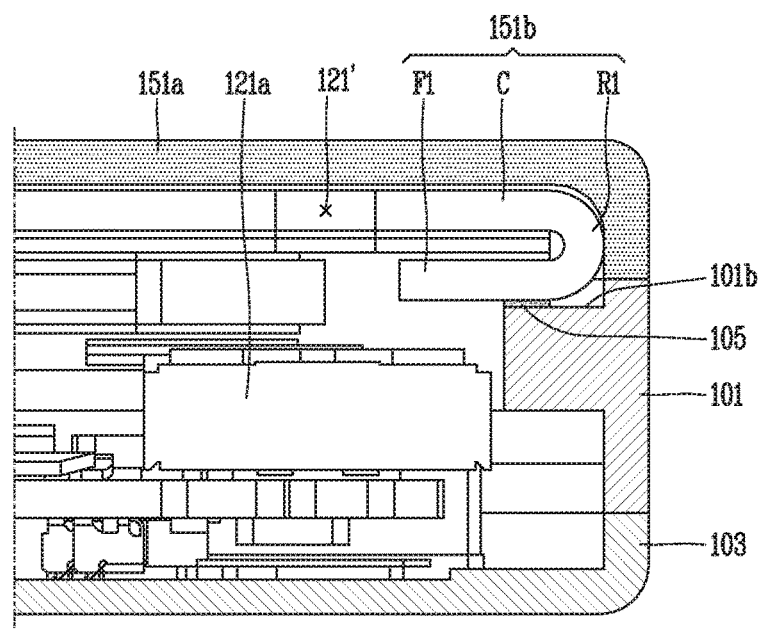

FIG. 5E is a partial sectional view taken along line 'A-A' in FIG. 5A, and FIG. 5F is a partial sectional view taken along line 'B-B' in FIG. 5A.

Referring to FIG. 5E, an electronic component such as the rear camera 121*b* is arranged on the rear surface of the body, and a circuit board 181 is arranged between the front case 101 and the rear cover 103.

The front case 101 includes a first supporting portion 101*a* for supporting the display unit. The first supporting portion 101*a* may be integrally formed with the front case 101, or may be formed as a separate inner frame.

An inner surface of the window 151*a* may be formed as a curved surface corresponding to the second curved surface (R2).

The second curved region (R2) is bent on the basis of the display region (c). And the second bent region (F2) is overlapped with the display region (c), and is supported by the first supporting portion 101*a*. The first supporting portion 101*a* adheres to the first supporting portion 101*a* of the front case 101 by a first adhesive member 104. An additional member for fixing the window 151*a* to the front case 101 is not required at the second curved surface (R2). One region of the second curved surface (R2) may output an image. That is, one region of the second curved surface (R2) covered by the window 151*a* may be implemented as a display region for outputting an image.

The window 151*a* may be formed to have an edge of a specific shape or a curved edge having a specific curvature, according to an appearance of the electronic device.

Referring to FIG. 5F, the first curved region (R1) is bent towards the inside of the body, and the first bent region (F1) is extended from the first curved region (R1) to thus be overlapped with the display region (c).

The front case 101 includes a second supporting portion 101*b*. The second supporting portion 101*b* may be integrally formed with the front case 101, or may be formed as a separate inner frame. The first bent region (F1) adheres to the second supporting portion 101*b* by a second adhesive 105. Thus, an adhesive member for fixing the window 151*a* to the front case 101 is not required at the first curved surface (R1).

Figure 6:
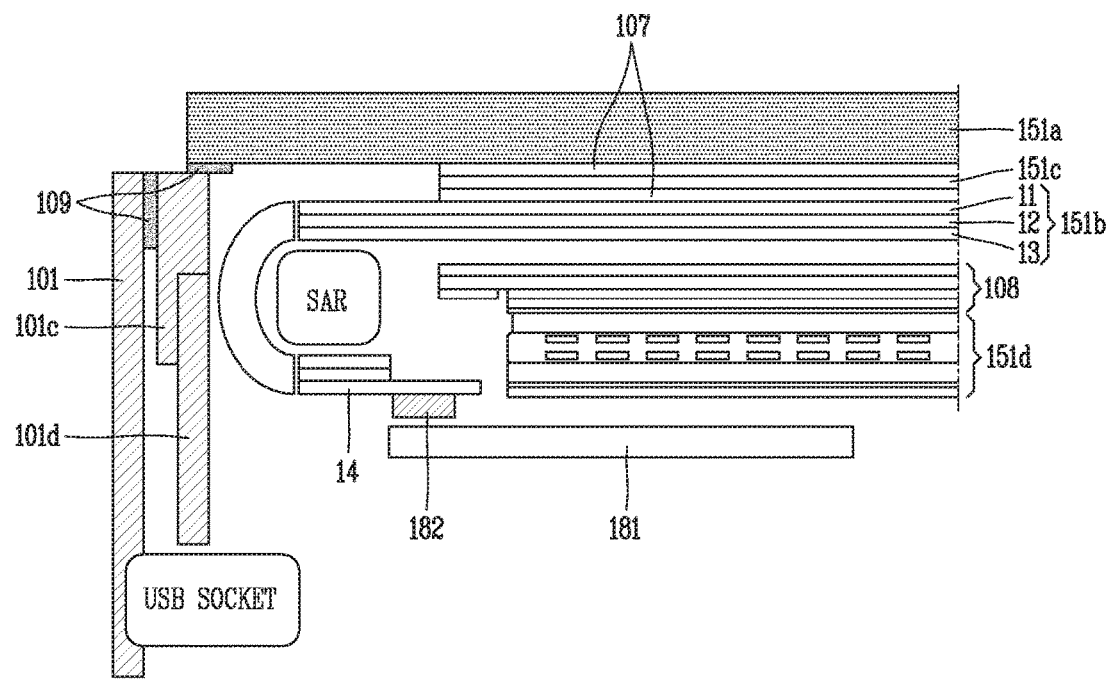
FIG. 6 is a conceptual view for explaining an arrangement structure of a display unit including a radiating structure and a pressure sensor.

FIG. 6 is a conceptual view for explaining an arrangement structure of the display unit including a radiating structure and a pressure sensor.

The display panel 151 includes a polarizing layer 11, an OLED display 12, and a bottom portion 13. The display panel 151*b* is bent in a state that a pressure sensitive adhesive (PSA) is interposed between regions of the display panel 151*b*. A driving IC 14 is formed at the end of the display panel 151*b*, and is electrically connected to the circuit board 181 by a connection member 182.

A pressure sensitive adhesive (PSA) may be disposed at an inner side of the curved region of the display panel 151*b*. A curvature of the curved region of the display panel 151*b* may be maintained by the PSA.

The display panel 151*b* adheres to the window 151*a* by adhesive members 107, and a touch sensor 151*c* is disposed between the adhesive members 107.

The display panel 151*b* including the curved region bent to have a specific curvature has its curved end connected to the circuit board 181. And the display panel 151*b* includes a radiating structure 108 and a pressure touch sensor 151*d* between the circuit board 181 and the display panel 151*b*.

The radiating structure 108 includes at least one graphite layer and metal layer. The pressure touch sensor 151*d* may include first and second substrates facing each other, first and second electrodes disposed between the first and second substrates, and a separation space. At least part of the radiating structure 108 and the pressure touch sensor 151*d* may be disposed to face the curved region of the display panel 151*b*.

The window 151*a* adheres to one region of the display panel 151*b*, and adheres to a first inner case 101*c* which forms an inner space of the body, by an adhesive member 109. The first inner case 101*c* adheres to the front case 101 which forms an appearance of the body by the adhesive member 109. The first inner case 101*c* is formed of a molding member, and is coupled to a second inner case 101*d* formed of a metal material.

The first and second inner cases 101*c*, 101*d* may protect the curved region from an external impact, because they support the curved region of the display panel 151*b*.

FIGS. 7A to 7F are conceptual views for explaining a structure of a display unit according to another embodiment of the present invention.

Figure 7A:
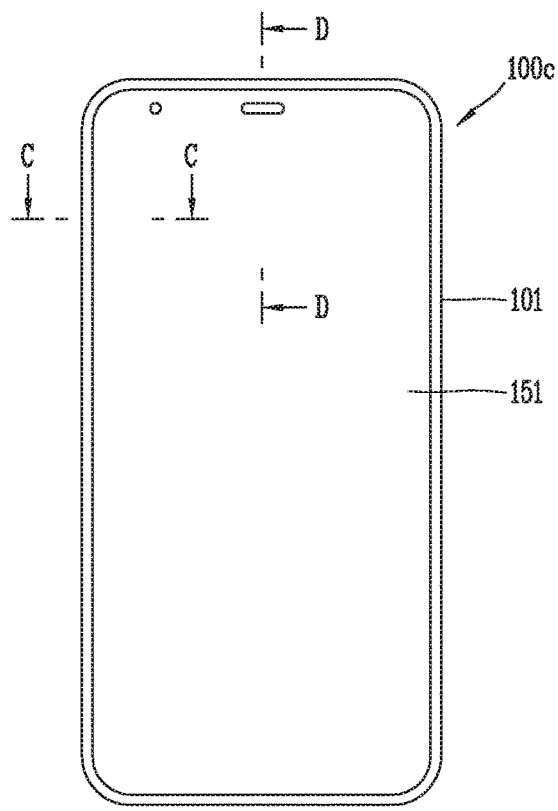
FIGS. 7A to 7F are views for explaining a structure of a display unit according to another embodiment of the present invention.
Figure 7B:
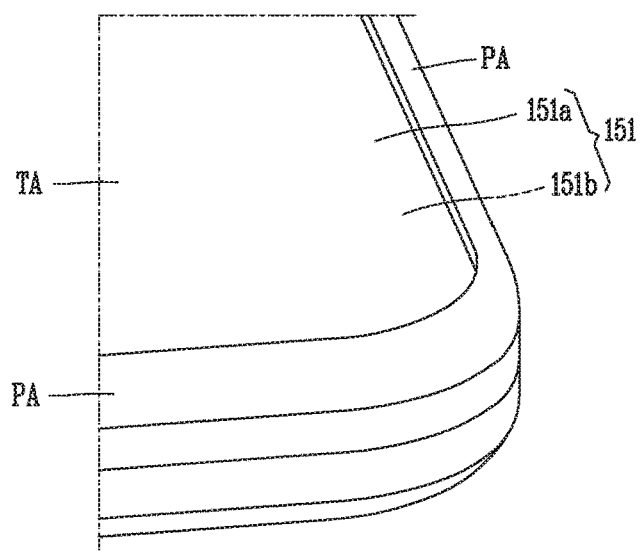

FIG. 7A is a conceptual view showing a front surface of an electronic device 100*c* according to an embodiment of the present invention, and FIG. 7B is an enlarged view of a part of the electronic device shown in FIG. 7A.

The electronic device 100c according to an embodiment of the present invention does not have a bezel portion which encloses an edge of the display unit 151. A window 151a forms a front surface and a part of a side surface of the electronic device 100c. The window 151a includes a transparent region (TA) and a printing region (PA). The transparent region (TA) corresponds to a flat region among a display region of a display panel 151b. The printing region (PA) is formed to enclose the transparent region (TA), and corresponds to one region which forms the side surface of the electronic device 100c. The printing region (PA) is formed by an opaque printing layer formed on an inner surface or an outer surface of the window 151a.

Figure 7C:
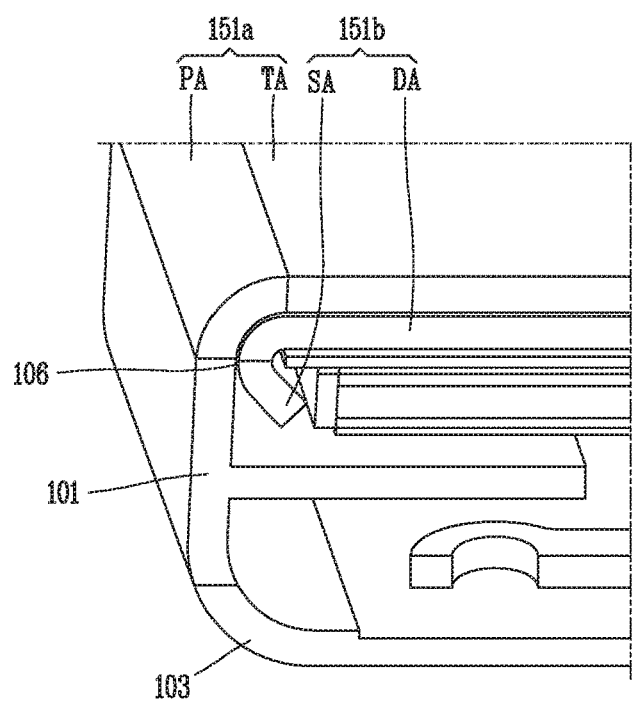
Figure 7D:
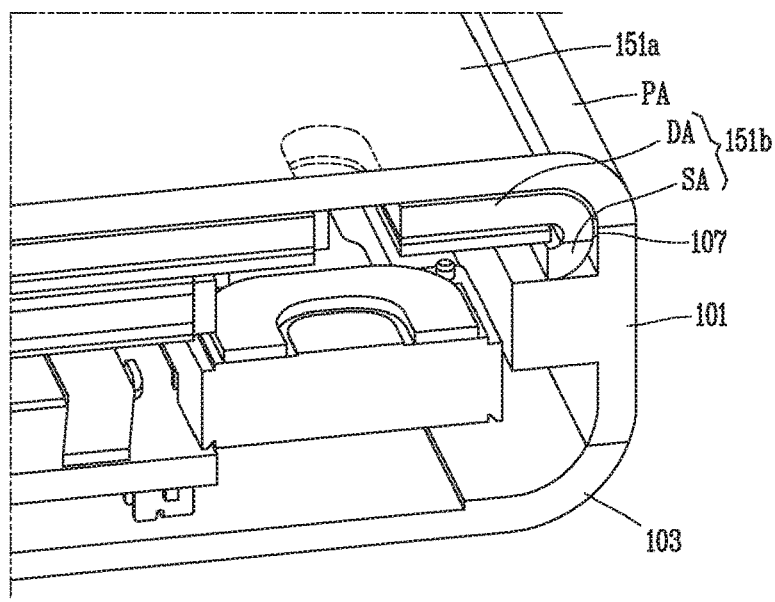
Figure 7E:
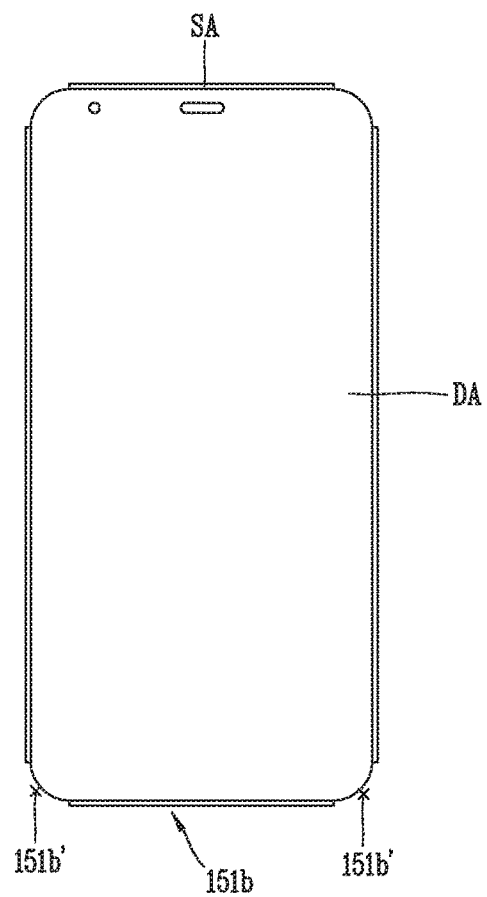
Figure 7F:
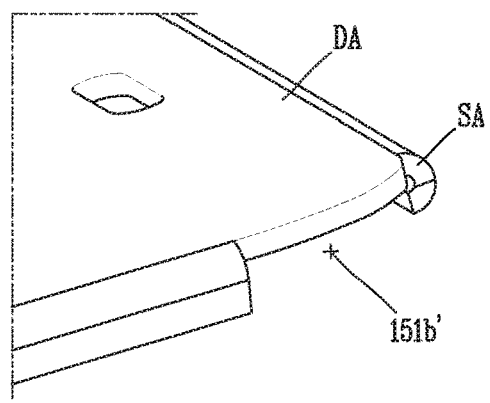

FIG. 7C is a partial sectional view taken along line 'C-C' in the electronic device 100c shown in FIG. 7A. FIG. 7D is a partial sectional view taken along line D-D' in the electronic device 100c shown in FIG. 7A. FIG. 7E is a conceptual view showing the display panel of the present invention. And FIG. 7F is a partial enlarged view of the display panel for explaining an open region.

The display panel 151b according to this embodiment includes a display region (DA) for outputting an image through the transparent region, and peripheral regions (SA) bent by edges of the display region (DA). Each of the peripheral regions (SA) is bent from an edge part which forms a flat surface, among the edge of the display region (DA). Thus, open regions 151b' not provided with the peripheral regions (SA) are formed at 4 corners of the display region (DA). With such a configuration, since the peripheral regions (SA) need not be overlapped with each other, the display panel may have a reduced thickness.

A bending angle of the peripheral region (SA) and/or a curvature of the peripheral region (SA) may be differently formed. The printing region (PA) of the window 151a is formed to cover the peripheral region (SA).

Although not shown, a filling material may be filled in the open region 151b'. Accordingly, impacts applied to the corners may be reduced by the filing material.

The peripheral region (SA) adheres to the printing region (PA) of the window 151a and an inner surface of the front case 101 by the adhesive member 107.

In this embodiment, since the front surface of the electronic device 100c is formed to have no bezel portion, an entire display region may be implemented. Further, since a bent region of the display panel is minimized, the electronic device may have a reduced thickness.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the electronic device.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An electronic device, comprising:
a body formed to have a front surface, a rear surface and side surfaces;
a display unit including a window, a touch sensor and a display panel which constitute a part of an appearance of the body;
a proximity sensor disposed near the display unit; and
a controller configured to generate a control command based on a touch input applied to the display unit,
wherein the display unit includes:
a first region which forms the front surface of the body;
a second region extended from the first region to one region of the rear surface, and including a curved region such that a side surface of the body is enclosed by the curved region, the second region further including a flat region disposed on the rear surface of the body; and
a third region formed as a curved region on one region of the side surfaces by being extended from the first region, and
wherein the controller controls the display unit to output specific screen information to the first region while the second and third regions remain in a deactivated state, in response to a touch input received at the flat region of the second region, the touch input received while all of the first, second, and third regions are in the deactivated state.

2. The electronic device of claim 1, wherein a touch sensor of the second and third regions is activated in response to a knock input received at the flat region of the second region.

3. The electronic device of claim 2, further comprising a case mounted to the body,
wherein the specific screen information is output based on a touch range of the touch input applied to at least one of the first and second regions,
wherein the case includes:
a first member which covers the front surface;
a second member which covers the rear surface; and
a third member which connects the first and second members to each other, and
wherein in a closed state that the first to third members are mounted to the body, a specific image is output by a part of the second region exposed by the case, or is output by the third region.

4. The electronic device of claim 3, wherein the specific screen information includes at least one of weather information, time information, or information on a received event.

5. The electronic device of claim 1, wherein if the touch input is sensed on both of the first and second regions, the controller controls the display unit to output screen information including an icon for executing a specific application, to the second region.

6. The electronic device of claim 1, wherein in an output state of an execution screen of a specific application to the first region, the specific application is controlled based on a consecutive touch input applied to the third region.

7. The electronic device of claim 1, further comprising a motion sensor for sensing a movement of the body, and
wherein the controller controls the display unit to output the specific screen information to the second region, based on the movement of the body.

8. The electronic device of claim 7, wherein the controller controls the display unit to display the specific screen information to the second region, if a specific type of touch input is applied to the second region while the body is arranged on a ground surface.

9. The electronic device of claim 1, wherein if first screen information and second screen information are output to the first and second regions, and if the first screen information and the second screen information are formed of a plurality of different icons, the controller outputs the second screen information to the first region based on a dragging touch input applied to the first region, and controls the display unit not to output a part of the first screen information any longer.

10. The electronic device of claim 9, wherein while the dragging touch input is maintained, a remaining part of the first screen information and the second screen information is continuously output to the first region, and
wherein while the dragging touch input is maintained, the controller executes a selected application based on an additional touch input applied to the first region.

11. The electronic device of claim 9, wherein an edition mode of the first and second screen information is activated based on a specific type of first touch input applied to one of the plurality of icons, and
wherein in the edition mode, the controller controls the display unit to output the second screen information to the first region, based on a second touch input consecutively applied to the first touch input.

12. The electronic device of claim 11, wherein if the second touch input is released, the controller controls the display unit to output the second screen information and one icon selected from the plurality of icons, to the second region.

13. The electronic device of claim 1, wherein if a touch input is sensed on the second region or the third region in an output state of an Always On Display (AOD) image to the first region, the controller converts the AOD image to a lock screen.

14. An electronic device, comprising:
a body;
a front case which forms an appearance of the body; and
a display unit which forms a front surface of the body, and formed to be assembled with the front case,
wherein the display unit includes:
a display panel including a display region for outputting an image, and a curved portion bent from the display region and extended towards inside of the body; and
a window disposed above the display panel, and formed to enclose the display panel so as to form the appearance of the body including the curved portion,
wherein the display region includes:
a first region which forms the front surface of the body;
a second region extended from the first region to one region of a rear surface of the body, and including a curved region such that a side surface of the body is enclosed by the curved region, the second region further including a flat region disposed on the rear surface of the body; and
a third region formed as a curved region on one region of the side surfaces by being extended from the first region, and
wherein the controller controls the display unit to output specific screen information to the first region while the second and third regions remain in a deactivated state, in response to a touch input received at the flat region of the second region, the touch input received while all of the first, second, and third regions are in the deactivated state.

15. The electronic device of claim 14, wherein the curved portion includes:
first and second curved regions extended from different edges of the display region; and
first and second bent regions extended from the curved portion, and formed to be overlapped with the display region.

16. The electronic device of claim 15, wherein the first and second curved regions are formed to have different curvatures, and
wherein the first and second bent regions are disposed to be overlapped with each other at least partially.

17. The electronic device of claim 16, wherein the front case of the body has a supporting portion for supporting the display unit, the front case being formed to form an appearance of one region of the body, and
wherein each of the first and second bent regions adheres to the supporting portion by an adhesive member.

18. The electronic device of claim 17, wherein the first and second curved regions are covered by the window and the front case.

19. The electronic device of claim 17, further comprising a pressure sensitive adhesive disposed on an inner surface of each of the first and second curved regions, the pressure sensitive adhesive being configured to maintain a curvature of each of the first and second curved regions.

20. The electronic device of claim 14, further comprising a pressure touch sensor disposed below the display region of the display unit.

21. The electronic device of claim 14, further comprising:
a front case formed to constitute side surfaces of the body, and formed to be assembled with the window; and
an adhesive member configured to adhere the curved portion and the window to each other.

22. The electronic device of claim 21, wherein the window includes a transparent region corresponding to the display region, and a printing region corresponding to the curved portion.

23. The electronic device of claim 14, wherein the display panel includes an open region formed at a part of the curved portion.

* * * * *